US011256678B2

(12) United States Patent
Patel et al.

(10) Patent No.: US 11,256,678 B2
(45) Date of Patent: Feb. 22, 2022

(54) RECONSTRUCTION OF LINKS BETWEEN LOGICAL PAGES IN A STORAGE SYSTEM

(71) Applicant: EMC IP Holding Company LLC, Hopkinton, MA (US)

(72) Inventors: Dixitkumar Vishnubhai Patel, Monroe, NJ (US); James O. Owens, Nashua, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 16/916,763

(22) Filed: Jun. 30, 2020

(65) Prior Publication Data

US 2021/0406241 A1    Dec. 30, 2021

(51) Int. Cl.
*G06F 16/00* (2019.01)
*G06F 16/22* (2019.01)
(52) U.S. Cl.
CPC ...... *G06F 16/2272* (2019.01); *G06F 16/2246* (2019.01)
(58) Field of Classification Search
CPC .......... G06F 16/2272; G06F 16/2246
See application file for complete search history.

(56) References Cited

U.S. PATENT DOCUMENTS

| | | | |
|---|---|---|---|
| 8,954,383 B1 | 2/2015 | Vempati et al. | |
| 9,003,227 B1 | 4/2015 | Patel et al. | |
| 9,104,675 B1 | 8/2015 | Clark et al. | |
| 9,778,996 B1 | 10/2017 | Bono et al. | |
| 10,210,048 B2 | 2/2019 | Sancheti | |
| 10,324,834 B2* | 6/2019 | Seo | G06F 12/0246 |
| 10,474,367 B1 | 11/2019 | Mallick et al. | |
| 11,061,770 B1* | 7/2021 | Patel | G06F 3/0617 |
| 11,099,940 B1* | 8/2021 | Patel | G06F 11/1469 |
| 2004/0054807 A1* | 3/2004 | Harvey | H04L 67/104 709/243 |
| 2018/0121344 A1* | 5/2018 | Seo | G06F 12/0246 |
| 2020/0133541 A1 | 4/2020 | Kleiner et al. | |
| 2021/0342298 A1* | 11/2021 | Mathews | G06F 16/24 |

OTHER PUBLICATIONS

G. Xu et al., "LIPA: A Learning-based Indexing and Prefetching Approach for Data Deduplication," Conference: 2019 35th Symposium on Mass Storage Systems and Technologies (MSST), May 20-24, 2019, 12 pages.

(Continued)

*Primary Examiner* — Jean M Cornelius
(74) *Attorney, Agent, or Firm* — Ryan, Mason & Lewis, LLP

(57) ABSTRACT

An apparatus comprises a processing device configured to determine that an entry of a first data structure comprises an indication that a link between a first logical page and a second logical page is broken and to determine that a first address pointed to by the first logical page and a second address pointed to by the second logical page match. The processing device is further configured to determine that the first logical page corresponds to the second logical page based at least in part on the determination that the first address and the second address match and to add an indication of a third address that corresponds to the first logical page to an entry associated with the second logical page.

20 Claims, 19 Drawing Sheets

(56) References Cited

OTHER PUBLICATIONS

NVM Express, "NVM Express, Revision 1.3," NVM Express, May 1, 2017, 282 pages.
Commvault, "Storage Policy (Snapshot)" https://documentation.commvault.com/commvault/v11/article?p=60105_1.htm, Sep. 12, 2019, 3 pages.
Oracle, "Managing Snapshots," https://docs.cloud.oracle.com/en-us/iaas/Content/File/Tasks/managingsnapshots.htm, 2020, 3 pages.
T. Finch, "Incremental Calculation of Weighted Mean and Variance," University of Cambridge Computing Service, Feb. 2009, 8 pages.
U.S. Appl. No. 16/260,660, filed Jan. 29, 2019, and entitled "System and Method for Aggregating Metadata Changes in a Storage System."
U.S. Appl. No. 16/861,986 filed in the name of Vladimir Shveidel et al. filed Apr. 29, 2020, and entitled "Lockless Metadata Binary Tree Access."
U.S. Appl. No. 16/862,733 filed in the name of Alexander S. Mathews et al. filed Apr. 30, 2020, and entitled "Finding Storage Objects of a Snapshot Group Pointing to a Logical Page in a Logical Address Space of a Storage System."
U.S. Appl. No. 16/862,735 filed in the name of Dixitkumar Vishnubhai Patel et al. filed Apr. 30, 2020, and entitled "Mapping Virtual Block Addresses to Portions of a Logical Address Space that Point to the Virtual Block Addresses."
U.S. Appl. No. 16/862,740 filed in the name of Rohit K. Chawla et al. filed Apr. 30, 2020, and entitled "Generating Recommendations for Initiating Recovery of a Fault Domain Representing Logical Address Space of a Storage System."
U.S. Appl. No. 16/863,433 filed in the name of Sorin Faibish et al. filed Apr. 30, 2020, and entitled "Cache Retention for Inline Deduplication Based on No. of Physical Blocks with Common Fingerprints Among Multiple Cache Entries."
U.S. Appl. No. 16/879,459 filed in the name of Yousheng Liu et al. filed May 20, 2020, and entitled "Reusing Overwritten Portion of Write Buffer of a Storage System."
U.S. Appl. No. 16/888,668 filed in the name of Kundan Kumar et al. filed May 30, 2020, and entitled "Selective Snapshot Creation Using Source Tagging of Input-Output Operations."
U.S. Appl. No. 16/897,388 filed in the name of Alex Soukhman et al. filed Jun. 10, 2020, and entitled "Garbage Collection in a Storage System at Sub-Virtual Block Granularity Level."
U.S. Appl. No. 16/907,560 filed in the name of Vamsi K. Vankamamidi et al. filed Jun. 22, 2020, and entitled "Regulating Storage Device Rebuild Rate in a Storage System."
U.S. Appl. No. 16/916,219 filed in the name of Vladimir Kleiner et al. filed Jun. 30, 2020, and entitled "Application Execution Path Tracing for Inline Performance Analysis."

\* cited by examiner

RECONSTRUCTION OF LINKS BETWEEN LOGICAL PAGES IN A STORAGE SYSTEM

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (TO) operation requests for delivery to the storage systems. Storage controllers of the storage systems service such requests for IO operations. Some storage systems use a logical address space, where logical page addresses in the logical address space map to physical page addresses on storage devices of the storage systems. The use of a logical address space facilitates various functionality, including implementation of deduplication in order to ensure that the same data is not repeatedly stored in a duplicative manner that consumes excessive storage capacity.

SUMMARY

In one embodiment, an apparatus comprises at least one processing device comprising a processor coupled to a memory. The at least one processing device is configured to determine that an entry of a first data structure comprises an indication that a link between a first logical page of a plurality of logical pages of a logical address space and a second logical page of the plurality of logical pages is broken and to obtain the first logical page based at least in part on the determination that the entry of the first data structure comprises the indication. The at least one processing device is further configured to obtain the second logical page based at least in part on the first logical page and to determine that a first address pointed to by a first pointer of the first logical page and a second address pointed to by a corresponding second pointer of the second logical page match. The at least one processing device is further configured to determine that the first logical page corresponds to the second logical page based at least in part on the determination that the first address and the second address match and to add an indication of a third address that corresponds to the first logical page to an entry associated with the second logical page based at least in part on the determination that the first logical page corresponds to the second logical page.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
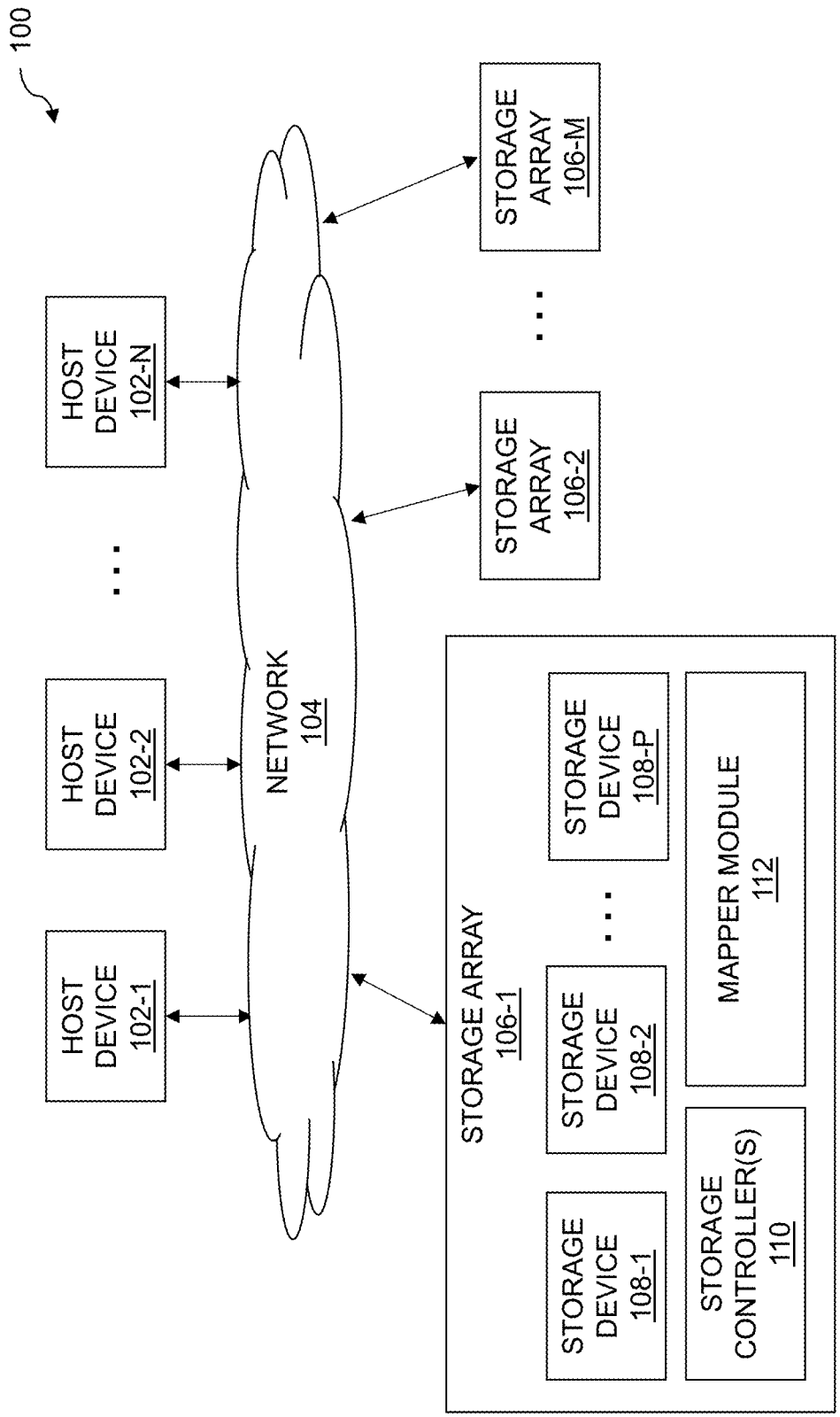
FIG. 1 is a block diagram of an information processing system including a storage array configured for reconstructing links between logical pages in an illustrative embodiment.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102 and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage array 106-1 in its persistent memory. The response time control module is assumed to operate in conjunction with the above-noted IO operation priority queues.

The storage array 106-1 illustratively utilizes its IO operation priority queues to provide different levels of performance for IO operations. For example, the IO operation priority queues may have respective different priority levels. The storage array 106-1 may be configured to provide different priority levels for different ones of the IO operations by assigning different ones of the IO operations to different ones of the IO operation priority queues. The IO operation priority queues are illustratively associated with respective SLOs for processing of IO operations in the storage array 106-1.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage arrays 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIGS. 14 and 15.

The storage array 106-1 implements a mapper module 112. Although not explicitly shown in FIG. 1 for clarity of illustration, it is assumed in some embodiments that other ones of the storage arrays 106-2 through 106-M implement respective additional instances of a mapper module, as well as respective sets of storage devices and storage controllers in a manner similar to that described herein with respect to storage array 106-1. Further, although shown in FIG. 1 as being external to the storage controllers 110 of storage array 106-1, in other embodiments the mapper module 112 may be implemented at least partially within one or more of the storage controllers 110. For example, at least one of the storage controllers 110 may be implemented as a virtual storage controller running on an embedded hypervisor of the storage array 106-1. The mapper module 112 may be part of such a virtual storage controller, or may be run separate from the virtual storage controller on such an embedded hypervisor. Various other arrangements are possible, including where at least a portion of the functionality of the mapper module 112 is implemented external to the storage array 106-1 (e.g., on one or more of the host devices 102, on a separate server, on a cloud computing infrastructure, etc.).

The mapper module 112 is configured to maintain mappings between storage objects of the storage array 106-1 (e.g., more generally, storage objects of a storage system, which may include a storage cluster including the storage array 106-1 and one or more other ones of the storage arrays 106-2 through 106-M) which point to particular logical pages in a logical address space of the storage array 106-1. To do so, the mapper module 112 maintains a tree structure that characterizes relationships between a plurality of storage objects in the storage array 106-1. The tree structure is assumed to comprise a plurality of logical page nodes representing the plurality of storage objects. Each of the plurality of logical page nodes specifies a logical page address in the logical address space of the storage array 106-1, and includes various metadata such as an array of pointers to one or more other logical page addresses in the logical address space, a snapshot group identifier for a snapshot group in the storage array 106-1, a logical extent offset in the logical address space and, in some embodiments, an array of pointers to one or more child logical page addresses in the logical address space (also referred to as a child array) and a pointer to a parent logical page address in the logical address space along with an index into the parent logical page's child array.

The mapper module 112 is further configured to scan the logical pages of the storage array, for example, as part of a file system check tool, in response to a query by a host device, etc., and the scan may identify one or more logical pages that have corruption or have otherwise lost the links to associated logical pages. The mapper module 112 traverses the tree structure to scan the one or more logical pages and identify those pages that may be associated with corruption. For example, in the case where a parent-child link between logical pages is corrupted, the mapper module 112 may traverse other available links between these logical pages along with any corresponding higher or lower level logical pages and other horizontal parent-child relationships. The mapper module 112 may then reconstruct the corrupted link between the logical pages based on the information found in one or both of the logical pages. In this way, the mapper module 112 is able to rebuild links between corrupted logical pages by taking advantage of the multi-directional horizontal and vertical relationships between the logical pages.

At least portions of the functionality of the mapper module 112 may be implemented at least in part in the form of software that is stored in memory and executed by a processor.

It is to be understood that the particular set of elements shown in FIG. 1 for reconstructing links between logical pages is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
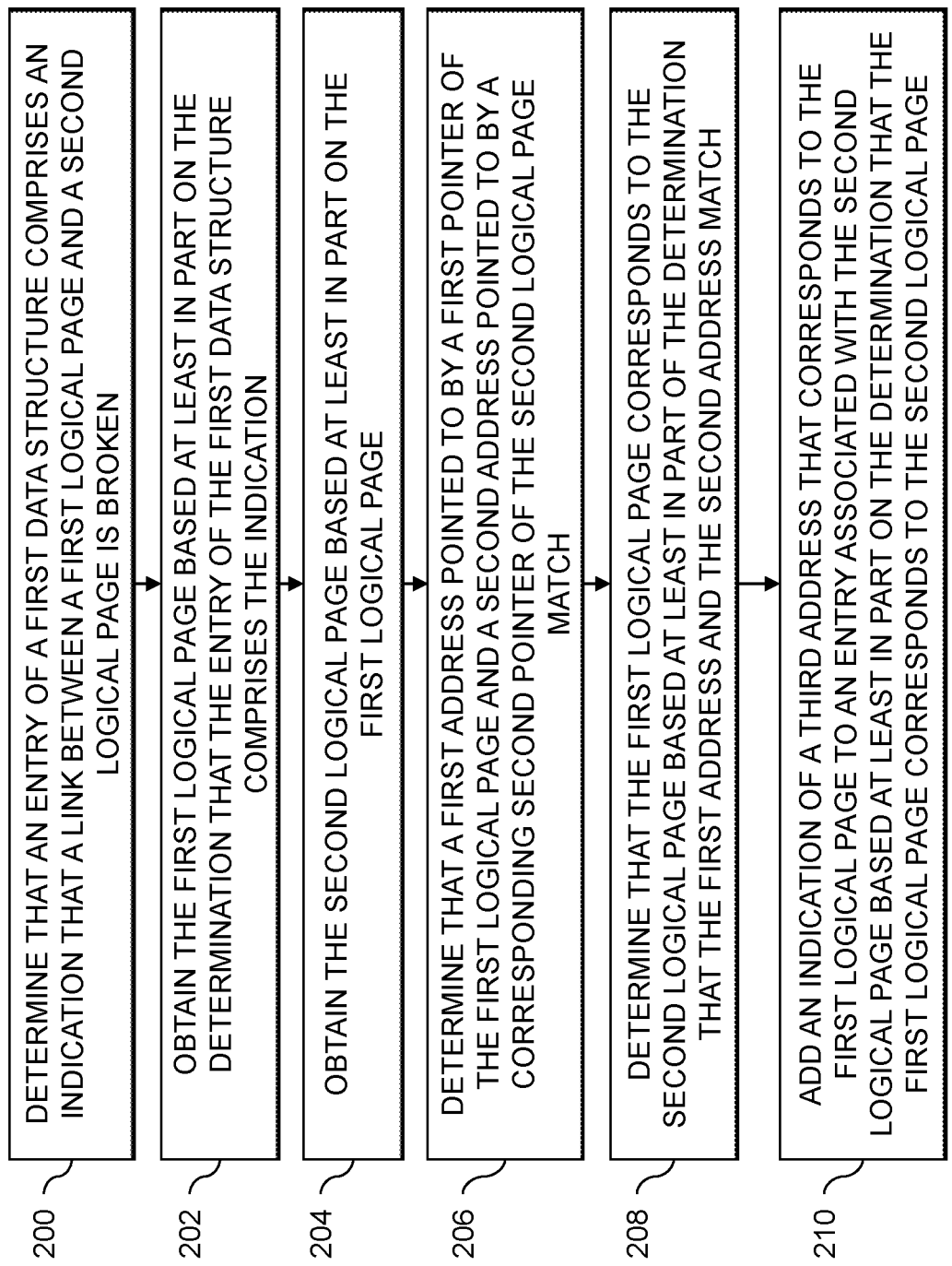
FIG. 2 is a flow diagram of an exemplary process for reconstructing links between logical pages in an illustrative embodiment.

An exemplary process for reconstructing links between logical pages will now be described in more detail with reference to the flow diagram of FIG. 2. It is to be understood that this particular process is only an example, and that additional or alternative processes for reconstructing links between logical pages may be used in other embodiments.

In this embodiment, the process includes steps 200 through 210. These steps are assumed to be performed by the storage array 106-1 utilizing the mapper module 112. The process begins with step 200, determining that an entry of a first data structure comprises an indication that a link between a first logical page of a plurality of logical pages of a logical address space and a second logical page of the plurality of logical pages is broken. The first logical page in an illustrative embodiment comprises a top page, mid page or leaf page of a logical address space and the second logical page comprises a corresponding logical page on the same level as the first logical page for which a parent-child relationship with the first logical page may exist.

In some embodiments, the logical address space is organized as a B-tree (an example of which will be described in further detail below with respect to FIGS. 4A and 4B), where the B-tree includes multiple levels including a root logical page level, a top logical page level below the root logical page level, a mid logical page level below the top logical page level and a leaf logical page level below the mid logical page level. The tree structure may comprise a hash of binary trees that arrange the plurality of logical page nodes into the various logical page levels. A given one of the top pages may represent an n*m sized portion of the logical address space that references n middle pages in the middle page level each representing an m sized portion of the logical address space, a given one of the middle pages referencing n leaf pages in the leaf page level each representing an m/n sized portion of the logical address space. In some embodiments, n is 512 and m is one gigabyte (GB).

In step 202, the mapper module 112 obtains the first logical page based at least in part on the determination that the entry of the first data structure comprises the indication.

In step 204, the mapper module 112 obtains the second logical page based at least in part on the first logical page.

In step 206, the mapper module 112 determines that a first address pointed to by a first pointer of the first logical page and a second address pointed to by a corresponding second pointer of the second logical page match.

In step 208, the mapper module 112 determines that the first logical page corresponds to the second logical page based at least in part of the determination that the first address and the second address match.

In step 210, the mapper module 112 adds an indication of a third address that corresponds to the first logical page to an entry associated with the second logical page based at least in part on the determination that the first logical page corresponds to the second logical page. The functionality of the mapper module 112 will now be described in more detail below with reference to FIGS. 3-13.

Figure 3:
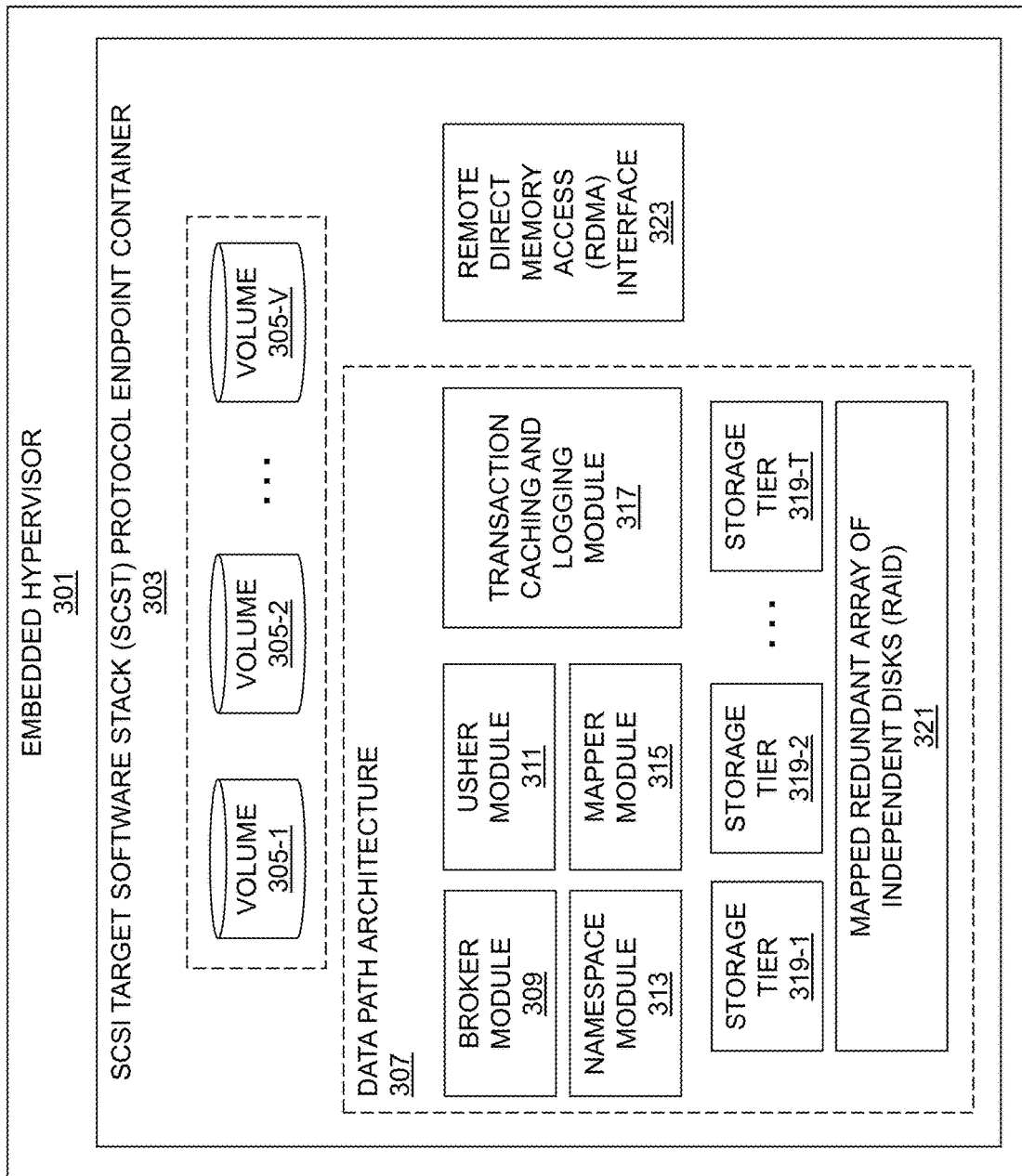
FIG. 3 is a block diagram of an embedded hypervisor implementing a data path architecture in an illustrative embodiment.

FIG. 3 shows a view of a data path architecture 307 for an I/O stack of a storage array (e.g., storage array 106-1). The data path architecture 307 is assumed to be implemented on an embedded hypervisor 301 (e.g., a VMware ESXi™ hypervisor) that runs a base container 303 providing an SCSI target software stack (SCST) protocol endpoint. The embedded hypervisor 301 is an example of a "virtual" storage controller of a storage system (e.g., a virtual one of the storage controllers 110 in storage array 106-1). The SCST protocol endpoint container 303 includes a set of volumes 305-1, 305-2, . . . 305-V (collectively, volumes 305) and the data path architecture 307. The data path architecture 307 includes a broker module 309, usher module 311, namespace module 313, mapper module 315, and a transaction caching and logging module 317. The data path architecture 307 also includes a set of storage tiers 319-1, 319-2, . . . 319-T (collectively, storage tiers 319) and a mapped redundant array of independent disks (RAID) 321. The transaction caching and logging module 317 is configured to utilize remote direct memory access (RDMA) interface 323 as described in further detail below.

The broker module 309 is configured to facilitate communication amongst the various other modules of the data path architecture 307. In some embodiments, the data path architecture 307 implements a layered services model (e.g., for copy engines, replication, migration, etc.). The usher module 311 is configured to implement I/O request queues, including priority share-based scheduling and Quality of Service (QoS) for I/O requests in such queues. The namespace module 313 is configured to implement active/active "thin" volumes and maintain volume attributes. The namespace module 313 is also configured to implement a key-value (K-V) store and directories. The mapper module 315 is configured to implement a thin mapping layer using log-structured writes, with inline compression, deduplication and pattern matching functionality. The mapper module 315 is also configured to implement functionality for snapshotting and determining snapshot differentials, for performing space accounting, and for file system checking (e.g., using a tool such as a Linux file system consistency check (FSCK) tool). In illustrative embodiments, the mapper module 315 implements the functionality described above for mapper module 112. The transaction caching and logging module 317 is configured to implement transactions for the active/active volumes, to perform distributed locking, and to implement read/write-back and write-ahead logs. The transaction caching and logging module 317 may comprise two instances, one for data and one for metadata. The mapped RAID 321 is configured to implement distributed virtual striping (e.g., using 4+1 and 8+1 RAIDS implementations) and to provide thin rebuild and distributed sparing. The mapped RAID 321 may support various native block sizes (e.g., 512 bytes (B), 4096B or 4 kilobytes (KB), etc.).

In some embodiments, the usher module 311 implements a data plane polling model. From the producer side (e.g., of the SCST protocol endpoint), requests are submitted using per-core threads. Polling threads pull new I/O requests to user space. The polling threads may execute when associated data plane threads are idle. Load balancing, affinity and QoS (e.g., share-based scheduling and traffic shaping) features may be provided.

The namespace module 313, as described above, is configured to create and expose thin block volumes, and provides functionality for volume management and attributes as well as space management and accounting. The namespace module 313 enables or provides a namespace layer that utilizes a block interface with file-like semantics. In the namespace layer, volumes (e.g., volumes 305) are bound to block protocol endpoints (e.g., PE LUNs). The mapper module 315 enables or provides a mapping layer, which exposes a single contiguous thin address space to the namespace layer. The namespace layer consumes the logical address space provided by the mapper layer.

The namespace layer may use a format that includes a "super block" created by an internal format and anchored at a logical block address (LBA) of 0. The super block identifies locations of allocations, an inode table, and a "root" directory. The allocations provide references to extent allocators, used to manage free space, as well as to inodes. The extent allocators may use a binary buddy system, and enable efficient reclaiming and defragmenting functionality. In some embodiments, the minimum allocation size is 8 MB, and the minimum allocation size for virtual volumes (VVols) such as volumes 305 is 2 GB. The volume allocation aligns to the "mid" level of the mapper as described in further detail below.

The inode allocators provide references to an inode table, which in some embodiments is scalable to millions of inodes and is organized as a free list. An inode may include various content, such as an object type (e.g., file, directory), family universally unique identifier (UUID), inode number and generation, link count, unique identifier (UID) owner, global identifier (GID) owner, object extent location, create and other timestamps, parent inode number, parent directory cookie, etc. The root inode references a root directory object that contains a list of file names and inodes, while additional inodes contain volume data (e.g., by allocating a data extent and inode, and adding the volume name and inode to the root directory). Multiple volume data extents may be created. Object handles may be used by the usher module 311 to submit I/O through handles (e.g., inodes) to avoid unnecessary name lookup.

The transaction caching and logging module 317 may implement a transaction cache and a transaction log. The transaction cache, in some embodiments, is transactional and provides read and write cache buffering with two instances (e.g., data and metadata). The transaction cache pages data and metadata in and out of memory, and provides local and distributed peer-to-peer (P2P) sticky locks. In some embodiments, an active/active configuration, an ALUA configuration, or combination thereof may be used. For example, the data path architecture 307 may be active/active, while SCST supports both active/active and ALUA. The transaction log provides write-ahead transaction logs, such as by using low latency mirrored NVRAMs for persistence. The transaction cache, for example, may be implemented in-memory (e.g., DRAM), while the transaction log is persisted to NVRAM.

The mapper module 315, as noted above, may provide a mapping layer of the data path architecture 307. The mapping layer may provide various functionality, such as enabling patterns, deduplication, compression, and mapping. Pattern functionality includes storing patterns (e.g., rather than pointer+data), and re-generating data on read, and may include 4 KB of 0s or 1s (where, in this context, 0s are different than unmapped space). Deduplication functionality includes the use of a fingerprint cache and read and compare validation. Compression functionality may include the use of various types of compression algorithms, including QAT hardware offload, LZ Deflate, Dynamic Huffman, etc. In some embodiments, data is compressed and packed into 2 MB data stripes. The mapping functionality includes a thin map, implemented in some embodiments as a 512-way B-tree structure described in further detail below. The thin map in such embodiments is keyed by LBA (e.g., rather than using content-addressable storage (CAS)), and provides snapshot and differential capability along with copy-by-reference. The mapper module 315 may utilize the storage tiers 319 (e.g., using flash tiers, storage-class memory (SCM) tiers, NVRAM tiers, etc.).

Figure 4A:
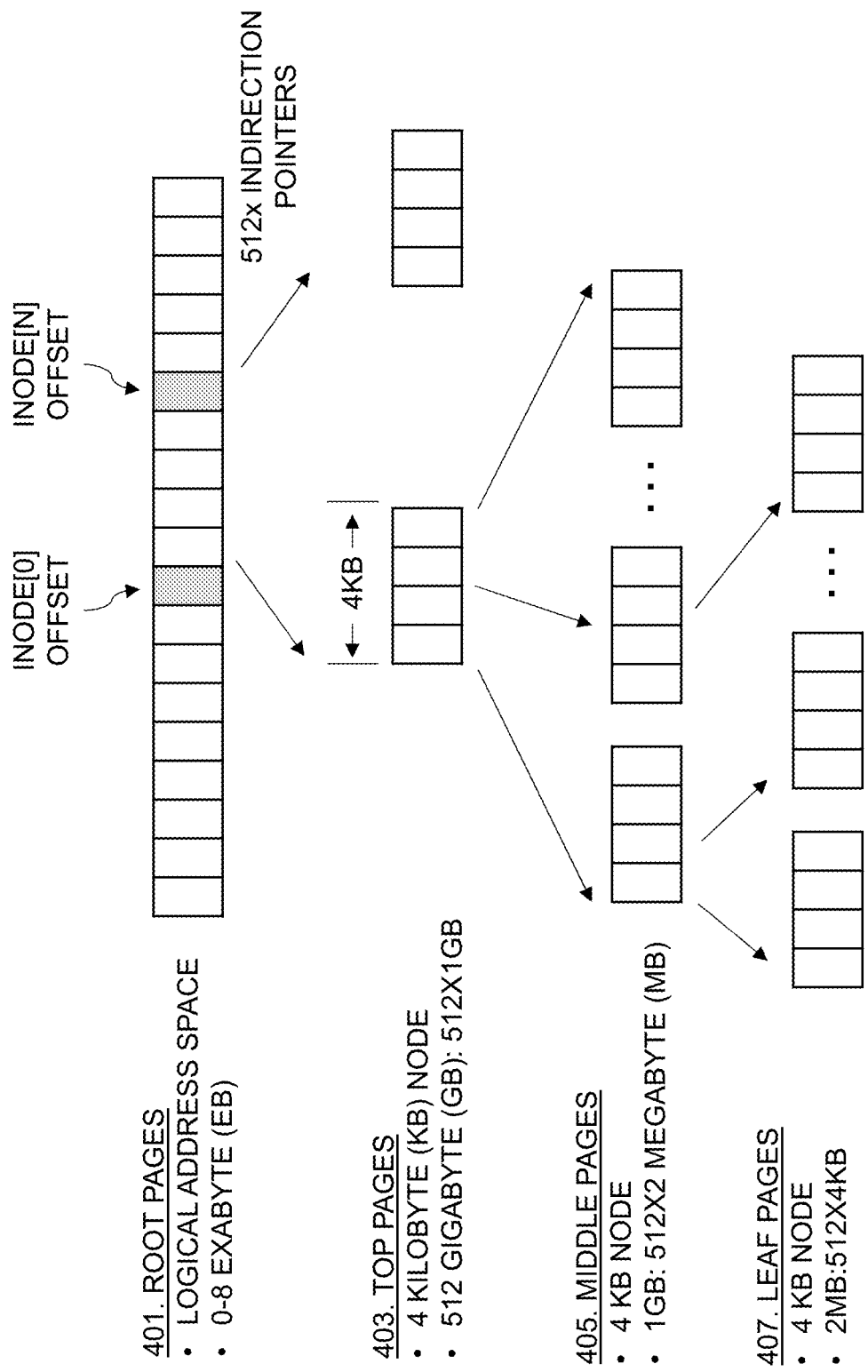
FIGS. 4A and 4B illustrate a tree structure for a logical address space in an illustrative embodiment.
Figure 4B:
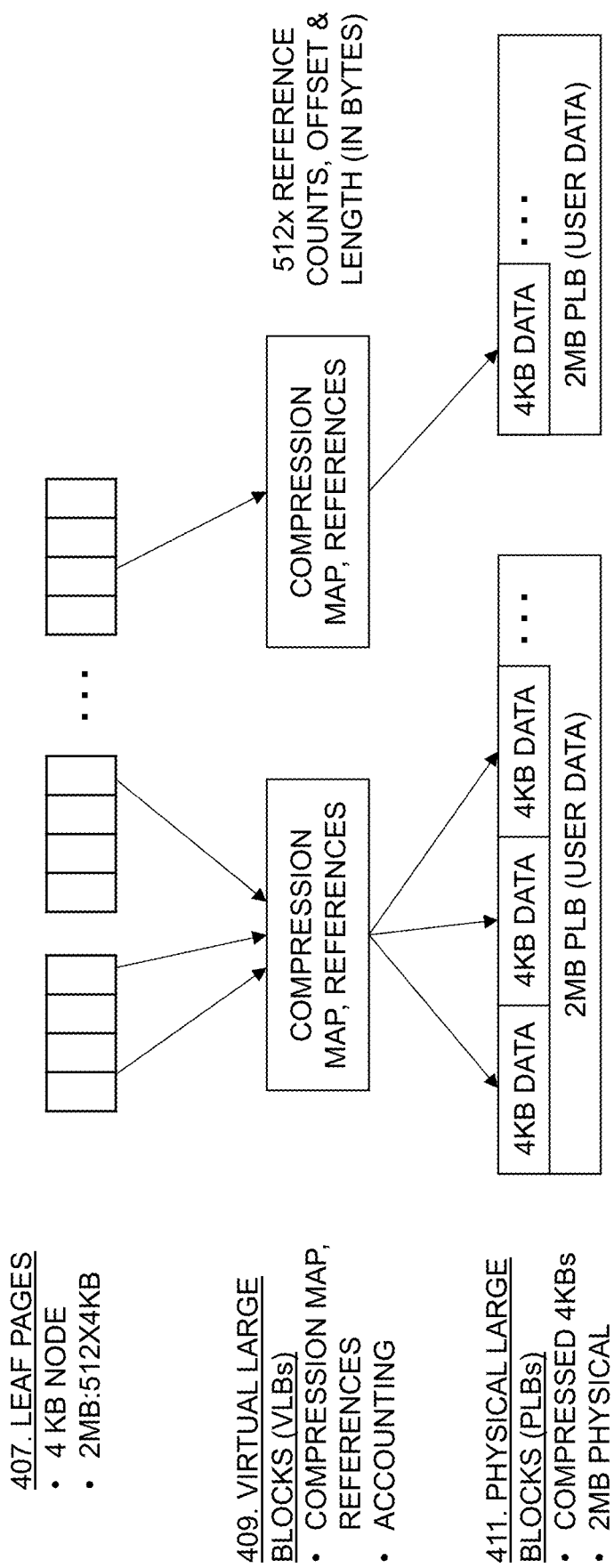

FIGS. 4A and 4B show a tree structure utilized by the mapper module 315 to store data in some embodiments. As noted above, the tree structure may comprise a 512-way B-tree structure, with levels for root pages 401, top pages 403, middle ("mid") pages 405, leaf pages 407, virtual large blocks (VLBs) 409, and physical large blocks (PLBs) 411. As illustrated in FIG. 4A, the root pages 401 provide a logical address space, which in some embodiments ranges from 0 to 8 exabytes (EB). The logical address space, which may be a thin logical address space, includes various inode offsets, two of which are labeled (e.g., inode[0] and inode[1]). Each of the inode offsets for the root pages 401 include a 4 KB node with 512 indirection pointers to respective ones of the top pages 403, each of the top pages 403 also has a 4 KB node with 512 pointers to respective ones of the middle pages 405, and each of the middle pages 405 has a 4 KB node with 512 pointers to respective ones of the leaf pages 407. Each of the leaf pages 407 may represent 2 megabytes (MB), and thus a given one of the middle pages 405 may represent 1 gigabyte (GB) (e.g., 512 of the leaf pages 407×2 MB) and a given one of the top pages 403 may thus represent 512 GB (e.g., 512 of the middle pages 405×1 GB).

As illustrated in FIG. 4B, each of the leaf pages 407 may include 512 pointers to VLBs 409 each representing 4 KB (e.g., such that a given one of the leaf pages 407 represents 2 MB as noted above, as 512×4 KB=2 MB). The VLBs 409 include reference counts, compression maps, and accounting information (e.g., offset and length, in bytes (B)) for the PLBs 411. Each of the PLBs 411 provides 2 MB physical space for storing user data (e.g., as a set of 4 KB compressed data blocks).

The mapper module 315 may access the tree structure of FIGS. 4A and 4B using keys, where a key for the root pages 401 level includes a host LBA and inode offset and index, where the index is the key divided by 256 terabytes (TB). At the top pages 403 level, the index is the key modulo 512 GB. At the middle pages 405 level, the index is the key modulo 1 GB. At the leaf pages 407 level, the index is the key modulo 2 MB.

Figure 5A:
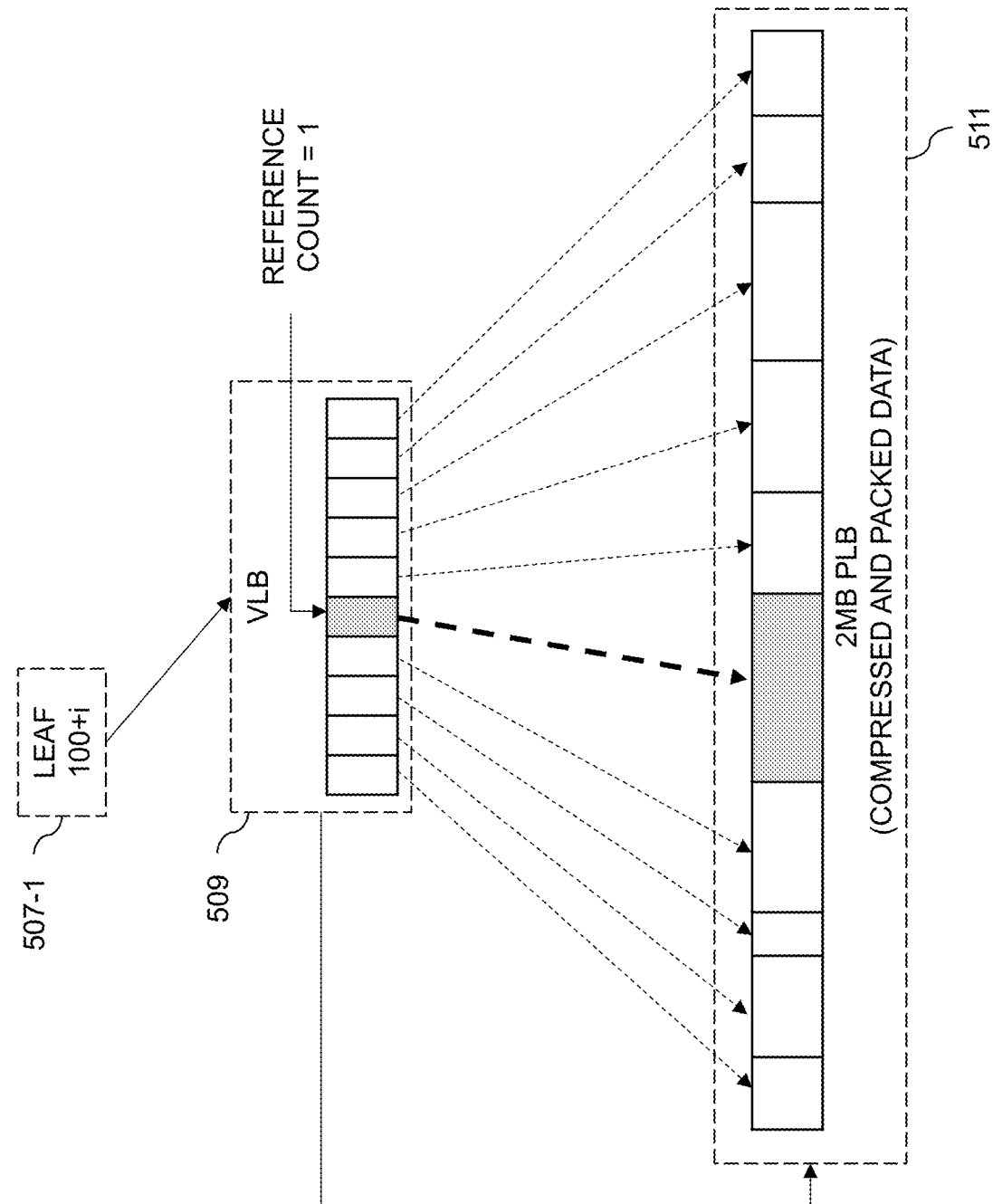
FIGS. 5A and 5B illustrate deduplication using a virtual large block of the tree structure of FIGS. 4A and 4B in an illustrative embodiment.
Figure 5B:
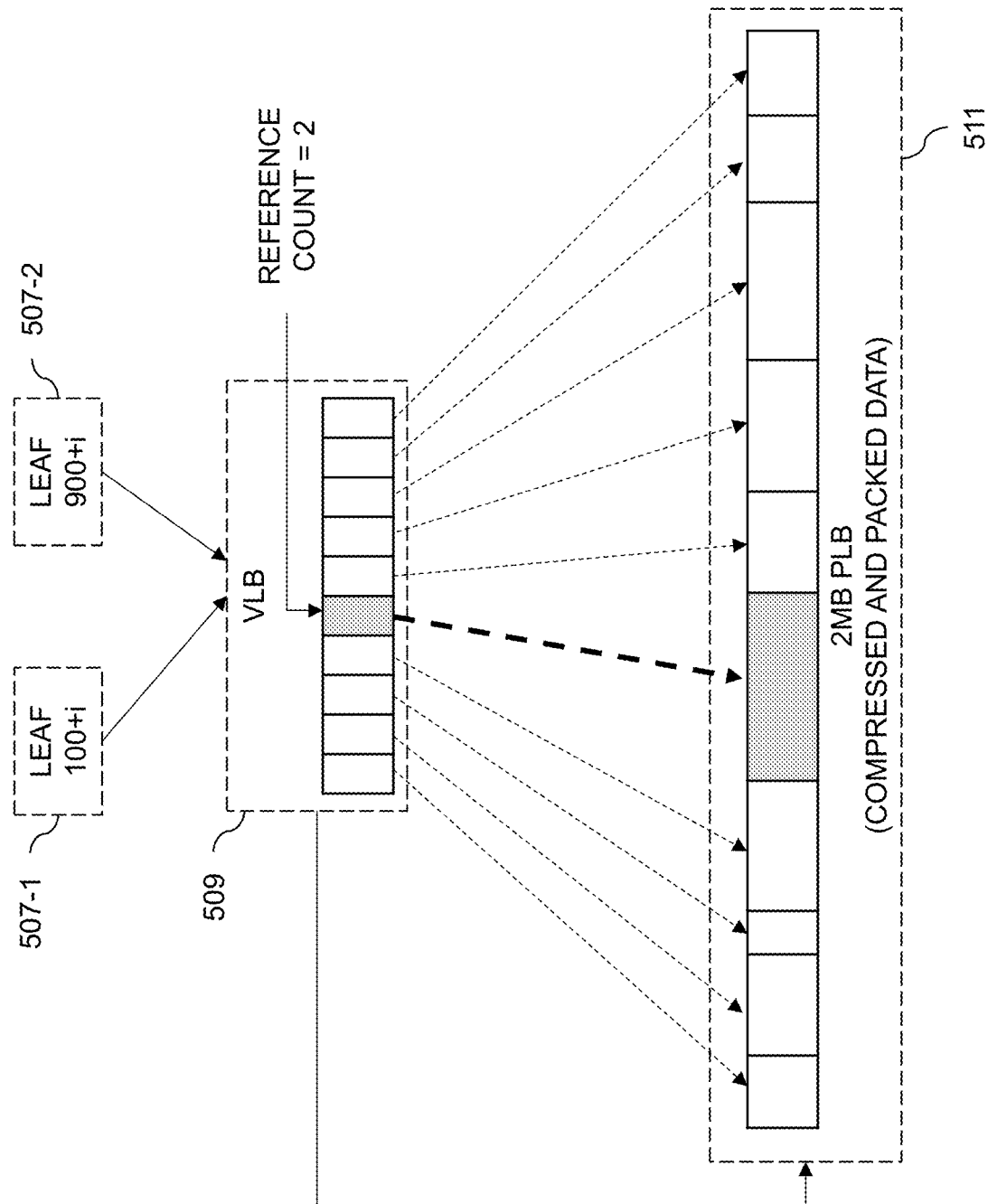

FIGS. 5A and 5B show deduplication using VLBs of the tree structure of FIGS. 4A and 4B. FIGS. 5A and 5B show a given VLB 509 and associated PLB 511 which includes 2 MB of compressed and packed data. The VLB 509 is assumed to contain a block address of the PLB 511, which provides a 2 MB data extent, and an array with 512 virtual entries. The virtual entries of a VLB, such as the 512 entries of VLB 509 in the example of FIGS. 5A and 5B, may be associated with respective virtual block addresses. Each VLB may thus be associated with a VLB extent that comprises a range of virtual block addresses (a VLB extent, in some cases, may include multiple VLBs such that its associated range of virtual block addresses span the multiple VLBs).

Each of the 512 virtual entries of the VLB 509 includes a byte offset to where a compressed 4 KB data portion starts in the PLB 511, as well as a byte length of the compressed 4 KB data portion and a reference count (e.g., the number of leaf page references to that compressed 4 KB data portion). In FIG. 5A, one leaf page 507-1 (e.g. leaf 100+i) references a particular compressed 4 KB data portion (e.g., shaded in gray) in the PLB 511. Thus, as shown in FIG. 5A, the reference count in the VLB corresponding to that portion (e.g., also shaded in gray) is 1. FIG. 5B shows that, when another leaf page 507-2 (e.g., leaf 900+i) also references that particular portion in PLB 511, the reference count for that portion in VLB 509 is updated to 2. In this way, two or more leaf pages can reference the same virtual block address. In the example of FIGS. 5A and 5B, deduplication has a granularity of 4 KB (e.g., the size of each compressed data portion in the PLB 511). Some embodiments enable a global deduplication domain, where any of the leaf pages can reference any of the compressed data portions in any of the PLBs. The reference count, however, may limit deduplication to a certain amount (e.g., 256:1).

To implement deduplication, a deduplication "fingerprint" cache may be utilized. The fingerprint cache may be implemented as a large K-V store, with N-way associative hashes providing fast, in-memory lookup that enables verification of deduplication with read and compare. Consider a piece of data, denoted $data_1$, that is found in the fingerprint cache. This may include hashing $data_1$, where the hash matches a key in the K-V store corresponding to a given VLB. The given VLB is then fetched to find the page referenced, and the corresponding portion of the associated PLB is read, decompressed and then compared to verify that $data_1$ is a duplicate. Consider another piece of data, denoted $data_2$, that is not found in the fingerprint cache. In this case, a new entry is added to the K-V store (e.g., a new K-V pair). If there is no remaining space, entries may be evicted using any suitable cache replacement algorithm, such as a least recently used (LRU) cache replacement algorithm. The $data_2$ is then stored as a new 4 KB data block in one of the PLBs.

The mapper module 315 may implement log-structured writes for efficient full stripe RAID writes (e.g., where each stripe is 2 MB continuing the example above) to flash memory using mapped RAID 321. Pending writes are flushed from the transaction cache or transaction log cache implemented by transaction caching and logging module 317. Patterns and duplications are subtracted, then the data is compressed and packed into a stripe. The full stripe is then written and mapped to the thin address space.

Figure 6A:
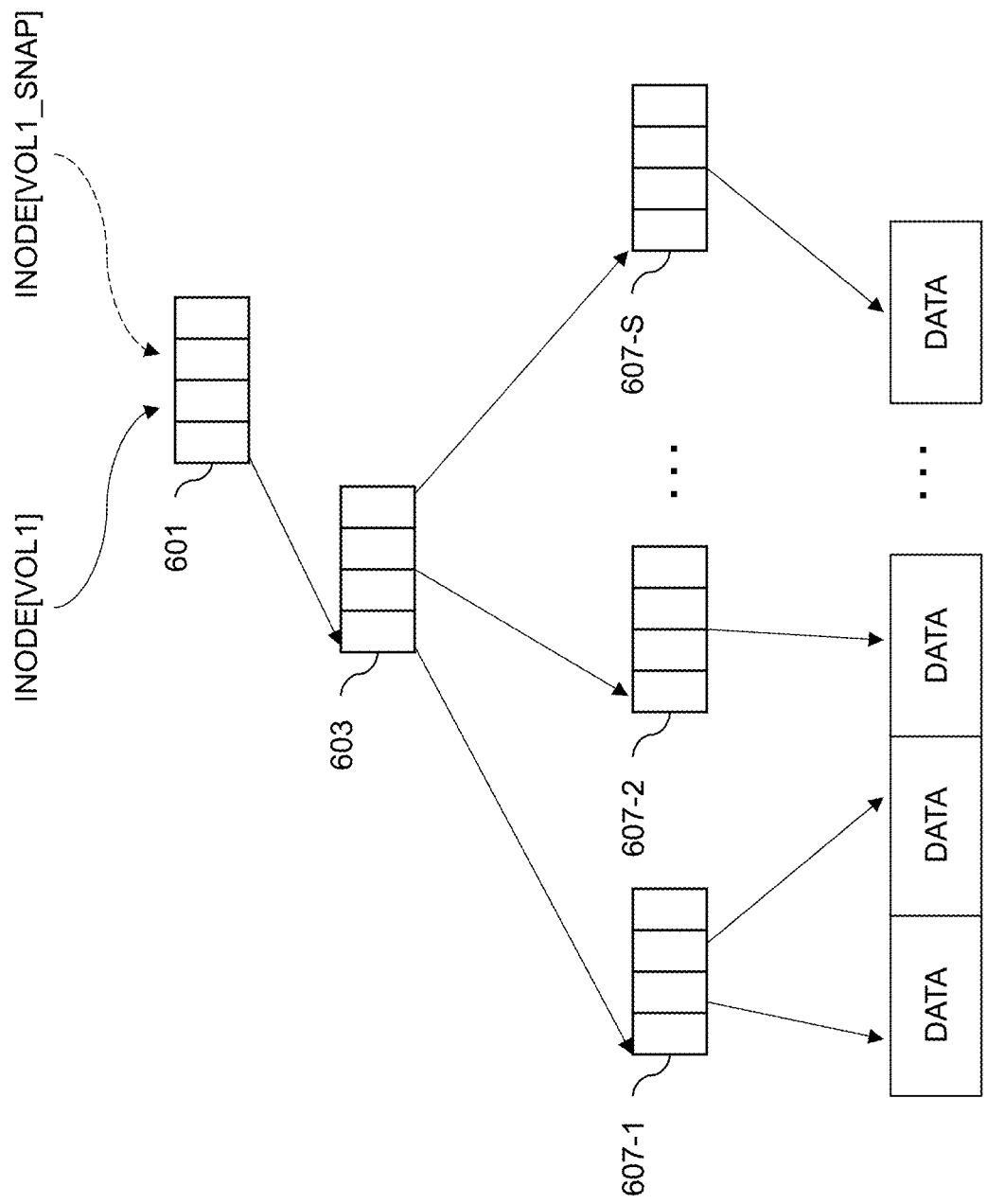
FIGS. 6A-6D illustrate snapshotting using the tree structure of FIGS. 4A and 4B in an illustrative embodiment.
Figure 6B:
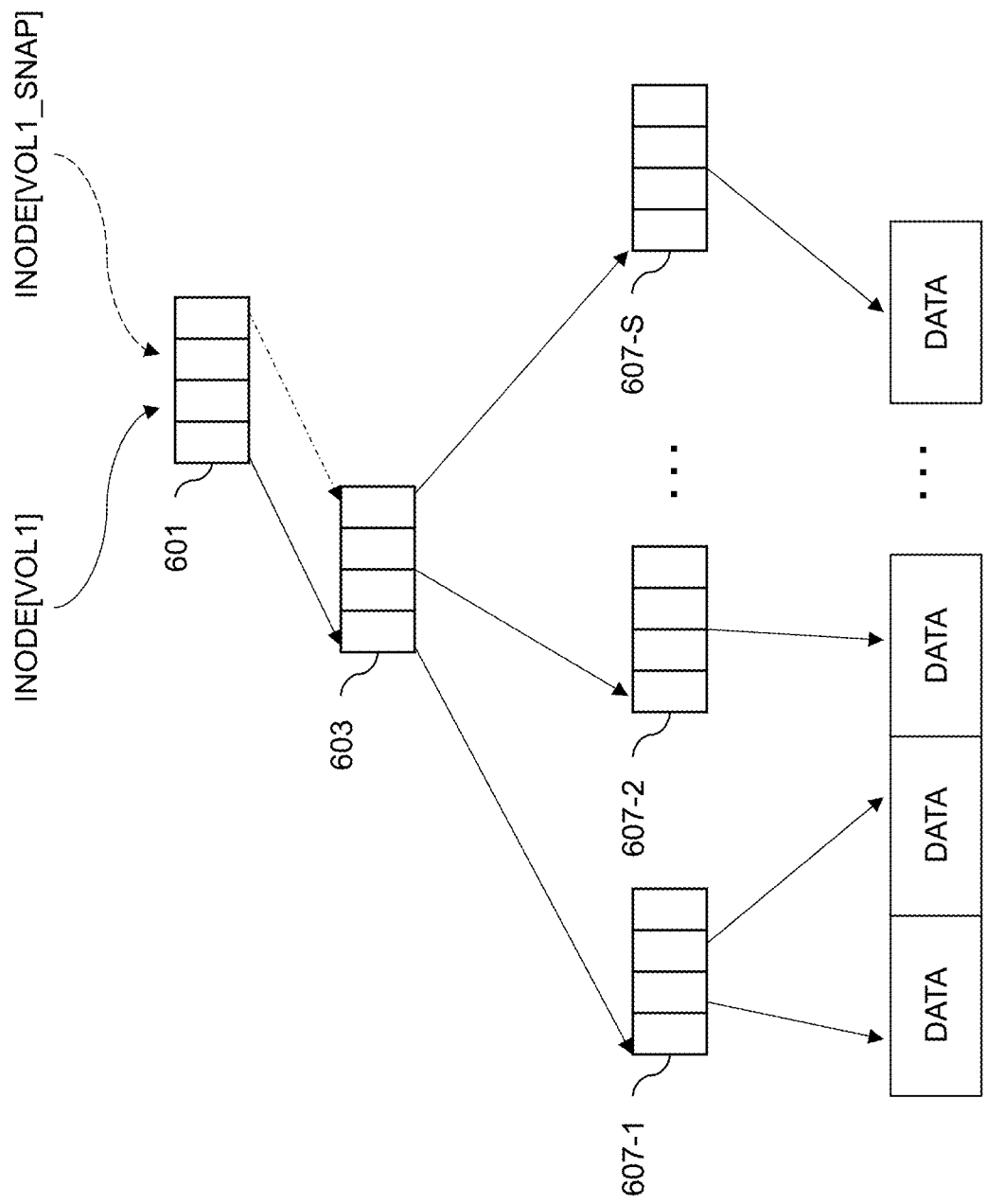
Figure 6C:
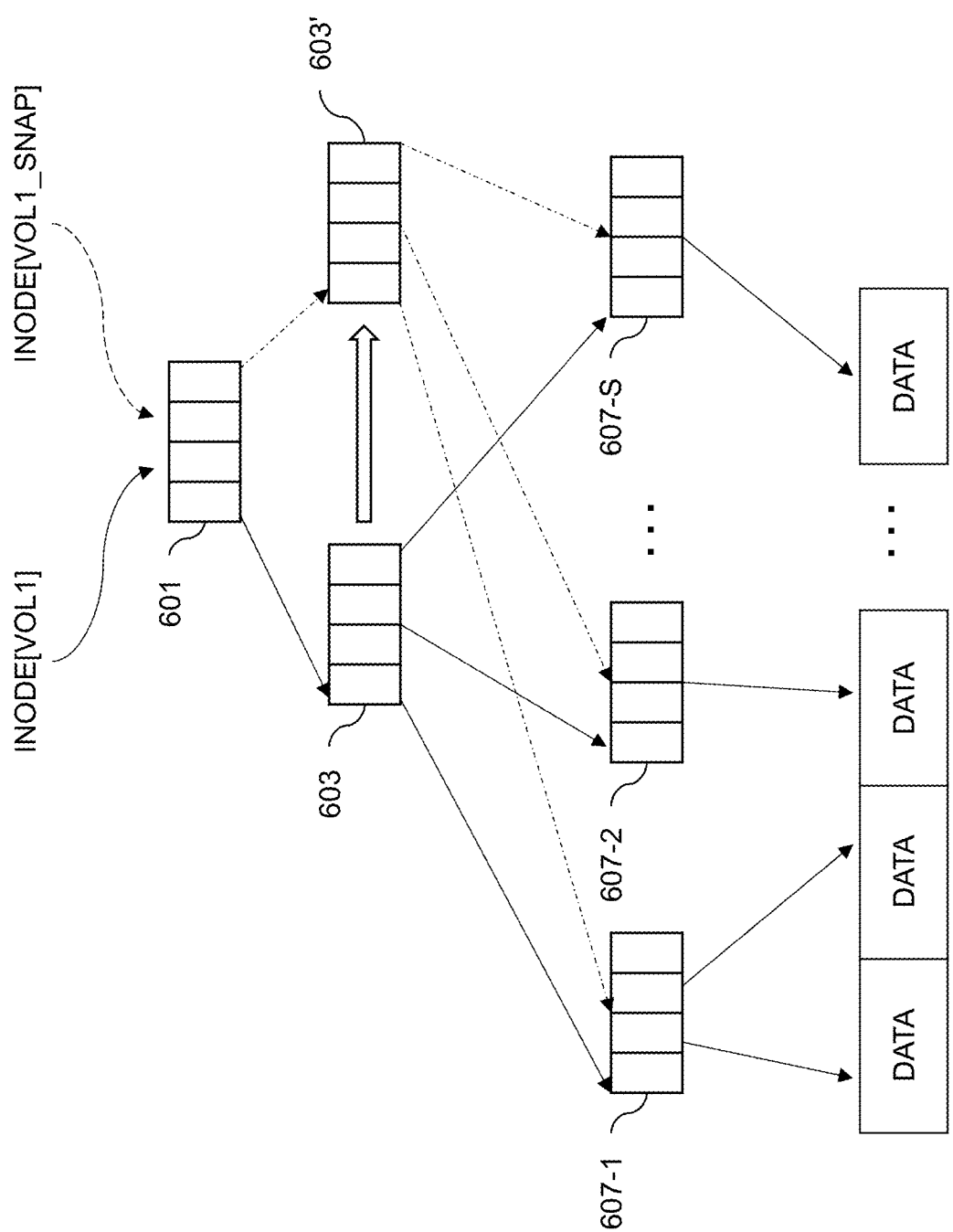
Figure 6D:
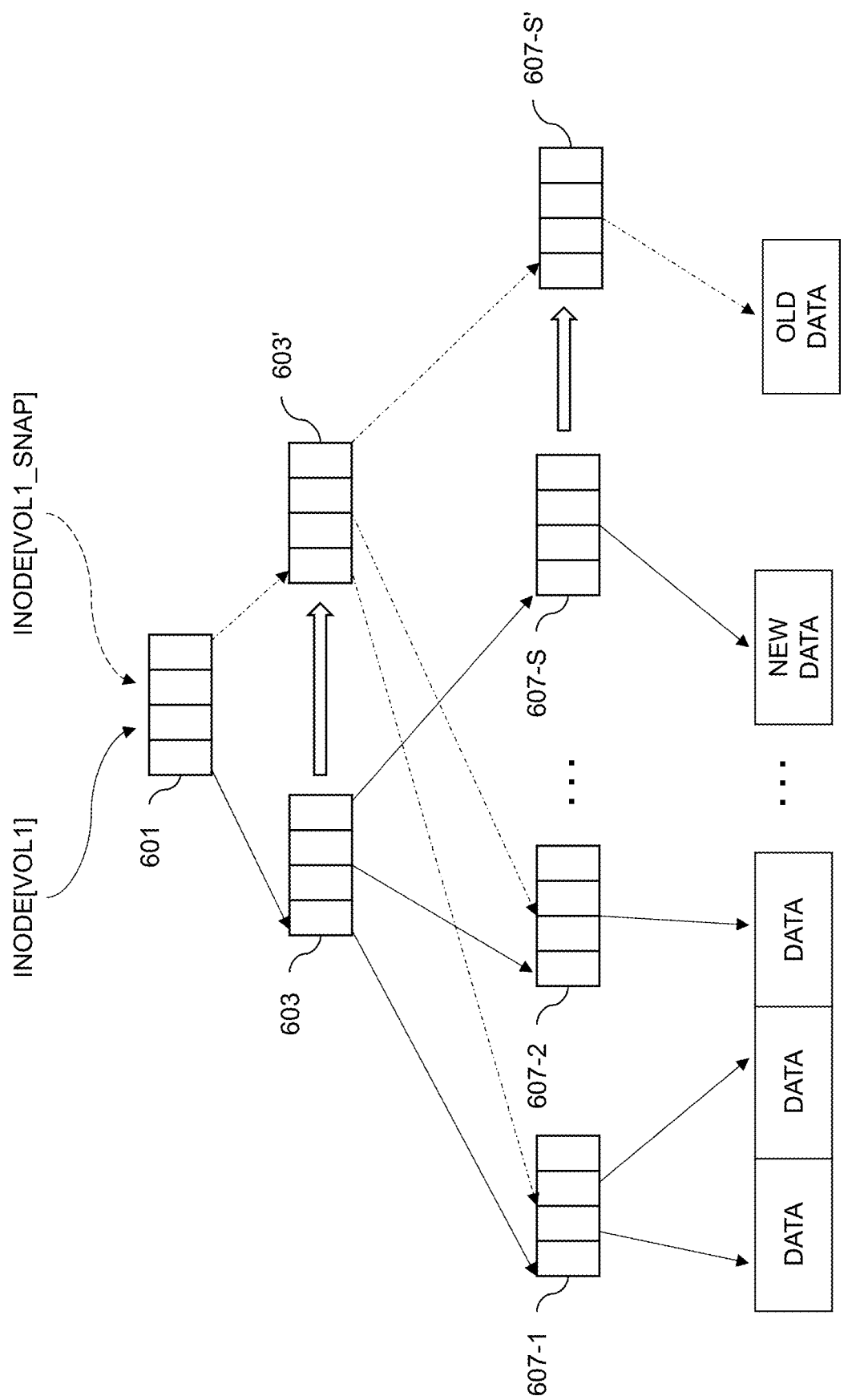

FIGS. 6A-6D illustrate snapshotting functionality enabled by the mapper module 315 using the B-tree structure described above with respect to FIGS. 4A and 4B. As shown in FIG. 6A, a particular inode for a volume (e.g., inode [vol1]) references a particular root page 601, which references a top page 603, which references a set of middle pages (not shown), which references a set of leaf pages 607-1, 607-2, . . . 607-S (collectively, leaf pages 607) which references underlying data (e.g., through VLBs and PLBs not shown). When a snapshot of the volume is created, another inode is allocated (e.g., inode[vol1_snap]) that references the root page 601 and copy-by-reference is performed as shown in FIG. 6B. On a first write to the volume (e.g., to vol1), the nodes of the tree structure are split in a recursive manner. First, the top page 603 is copied to top page 603' as shown in FIG. 6C. Middle pages (not shown) are then copied, follow by copying one of the leaf pages 607 affected by the write. As shown in FIG. 6D, this includes copying leaf page 607-S to leaf page 607-S'. The new data to be written is stored in one or more VLBs and PLBs referenced by leaf page 607-S, while the old or existing data is stored in one or more VLBs and PLBs referenced by leaf page 607-S'.

The mapped RAID 321, as noted above, implements virtual striping (e.g., using 4+1 and 8+1 RAIDS), enabling thin rebuild, distributed sparing, and various native block sizes (e.g., 512B, 4096B, etc.). The RAID geometry may be selected based on the number of SSD disks (e.g., with 6-9 SSDs, 4+1 RAID may be used, with 10+ SSDs, 8+1 RAID may be used). It should be noted that embodiments are not limited to using SSD disks in a RAID. In other embodiments, other types of disks or storage devices may be used. The description below, however, assumes the use of SSDs for clarity of illustration. In some cases, the mapped RAID 321 may use resiliency sets, as reliability may drop as more SSDs are grouped together. To constrain the fault domain, resiliency sets may be split once a threshold number of SSDs is reached (e.g., with a 25 SSD maximum, the resiliency set is split on adding a 26$^{th}$ SSD).

In some embodiments, the mapped RAID 321 includes a disk layout that has a minimum number of 6 SSD disks (e.g., flash SSDs or 3DXP SSDs). Serial attached SCSI (SAS) expansion may be used to expand the number and size of disks used. In some embodiments, particular slots or disks (e.g., 2 or 4 NVRAM SSDs) may be reserved for use as the transaction log cache implemented by transaction caching and logging module 317. A global configuration database (DB) may be stored using 1 MB on each drive in the mapped RAID 321, which includes a GUID and drive state information. The mapped RAID 321 may include a RAID map DB that is 3-way mirrored across three of the disks, and includes information such as RAID type, width, etc. The mapped RAID 321 also utilizes metadata, data, and possibly other tiers. The mapper module 315 is configured to expand the tiers for more space, where expanding a tier includes forming a RAID geometry by allocating slices, adding to the RAID map, and returning to the mapper layer. A slice of the mapped RAID 321 may include 4 GB RAID allocation extents (NVRAM may use 128 MB), one or more "ubers" that each include N+1 slices grouped into a RAID set (e.g., 1+1, 4+1, 8+1, etc.), and one or more tiers each including a group of ubers.

In summary, the data path architecture 307, on receiving an I/O request from a host to store data, will write the data quickly and persistently to a cache (e.g., the transaction cache implemented by the transaction caching and logging module 317) and then send an acknowledgement to the host. The data path architecture 307 will then utilize the mapper module 315 to identify and subtract patterns and duplicates in the data to form a flush set (e.g., a 2 MB flush set). The flush set is then compressed, packed and written to 2 MB stripes (e.g., in the mapped RAID 321).

In a log structured file system, such as that used in the data path architecture 307, mappings (e.g., as provided using the mapper module 315) provide critical information that links the user data to the physical location on the storage devices (e.g., SSDs). When file system checks (e.g., using a tool such as FSCK) are run, the consistency of the map is validated by cross-checking the linkages between the root pages 401, top pages 403, mid pages 405 and leaf pages 407. For example, when the file system check determines that one or more nodes of the map are corrupted, missing linkages, or otherwise in error, the linkages need to be rebuilt if possible.

In the logical address space of the mapper layer provided by mapper module 315 in the data path architecture 307, each logical page may be associated with various metadata, including an indirect data page (IDP) address (e.g., IDP 100, IDP 200, etc.). The IDP is an example of what is more generally referred to as an indirect block address. Each logical page may also include an array of IDP addresses that the logical page points to. The logical page that is associated with a particular IDP address is also referred to as an IDP page.

When performing recovery and other tasks, there may be a need to find the storage objects (e.g., volumes, snapshots, clones, etc.) that point to a particular logical page (e.g., a particular IDP page) in the mapper's logical address space. As described above, for example, it may be desired to find the mappings to a given corrupted IDP page. To do so, two relationships are used: vertical relationships and horizontal relationships. The vertical relationship is navigated by the offset of a given storage object. The horizontal relationship represents a parent-child relationship for a given snapshot family. Information associated with the vertical and horizontal relationships may be stored as a "back pointer" within each IDP page (e.g., top pages 403, mid pages 405 and leaf pages 407 in the logical tree structure of FIGS. 4A and 4B). The relevant information from the back pointer that is used to navigate the vertical and horizontal relationships, in some embodiments, include a namespace address (e.g., from a namespace layer of the data path architecture 307 implemented by namespace module 313), extent offset, and snapshot group identifier (ID).

A two-level data structure may be built-up during the initial browsing of the IDP pages (e.g., top pages 403, mid pages 405 and leaf pages 407) associated with each storage object. This two-level data structure maintains the relationships of the set of storage objects within a given snapshot (snap) group. In some embodiments, the two level-data structure may be viewed as a hash of binary trees, with there being a binary tree for each snap group. The first level of the two-level data structure is navigated based on the snap group IDs to find binary trees in the second level that characterize the relationships between storage objects for the snapshot groups associated with a selected snap group ID. Given a binary tree for a given snap group ID, it is possible to iterate over the storage objects in the snap group and then also to traverse the vertical relationships for each storage object using the namespace address stored in that storage object. An example of the two-level data structure is illustrated in FIG. 7.

A client (e.g., one of host devices 102, the file system check tool such as FSCK, etc.) that wants to search storage objects may provide the desired IDP page address, snap group ID, and extent offset. Given the snap group ID and extent offset from the back pointer of any IDP in the mapper address space, all the storage objects in the given snap group ID may be iterated over to check whether the desired IDP page address is found at the given extent offset. There are various use cases in which such reverse logical lookups are required. For example, such reverse logical lookups may be used to find the vertical and horizontal IDP pages for a given corrupted or orphaned IDP page. Being able to find the vertically and horizontally connected IDP pages provides the ability to potentially fix the corruption related to that IDP page. As another example, such reverse logical lookups may be used to report a corruption that cannot be repaired and results in data loss for all corresponding storage objects that map to the corrupted metadata object (e.g., an IDP page, a VLB object, etc.).

Figure 7:
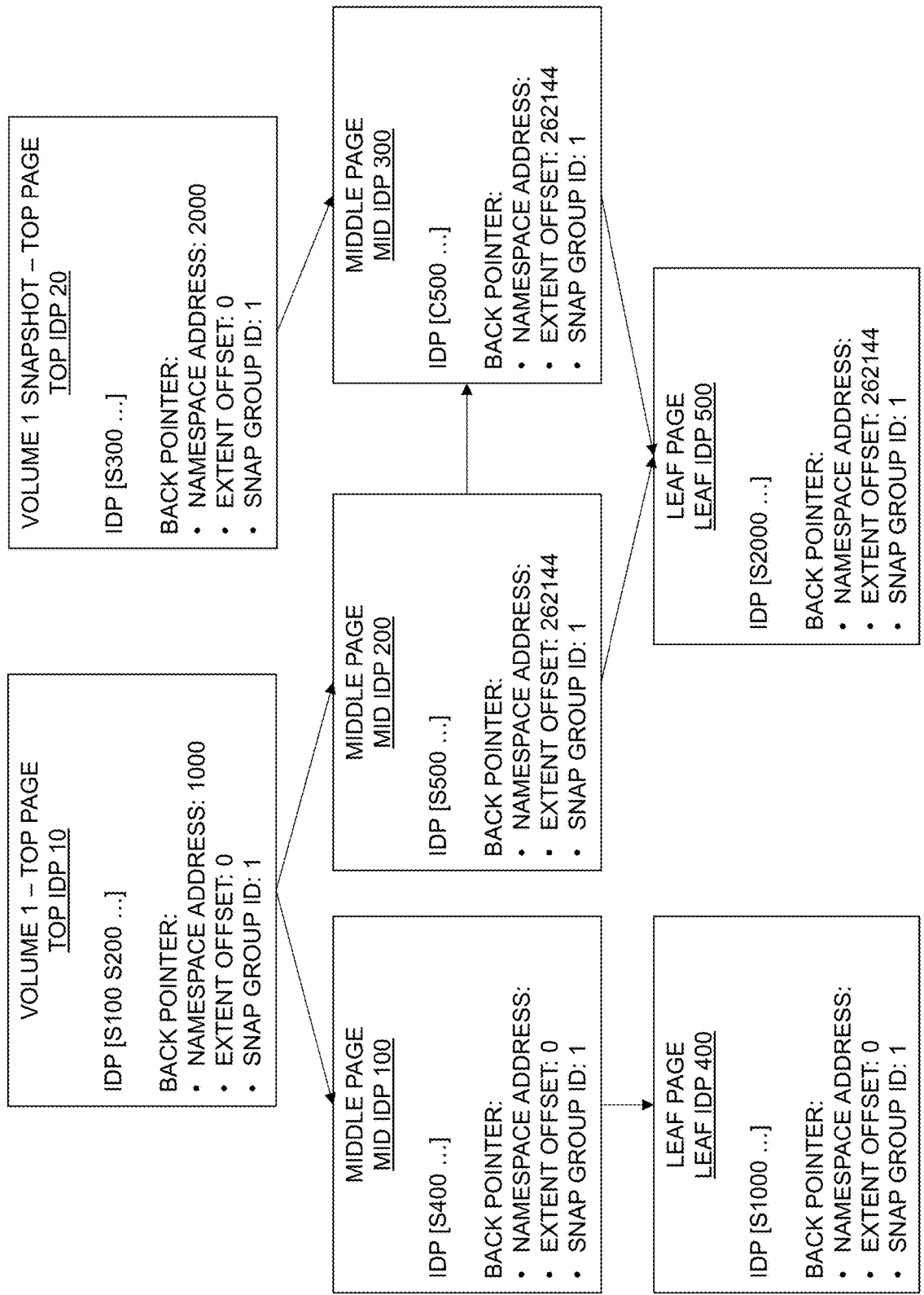
FIG. 7 shows a portion of a logical tree mapping for a reverse logical lookup of a given logical page address in an illustrative embodiment.

In FIG. 7, each of the IDP pages (e.g., top IDP pages 10 and 20, mid IDP pages 100, 200 and 300, and leaf IDP pages 400 and 500) includes an array of IDP addresses. For example, top IDP page 10 includes IDP addresses of S100, S200, etc. The "S" in such addresses denotes source, while the "C" in addresses for other ones of the IDP pages in FIG. 7 denotes copy (e.g., "C500" in mid IDP page 300). Each of the IDP pages shown in FIG. 7 also includes a back pointer as described above, with a namespace address, extent offset and snap group ID.

Figure 8:
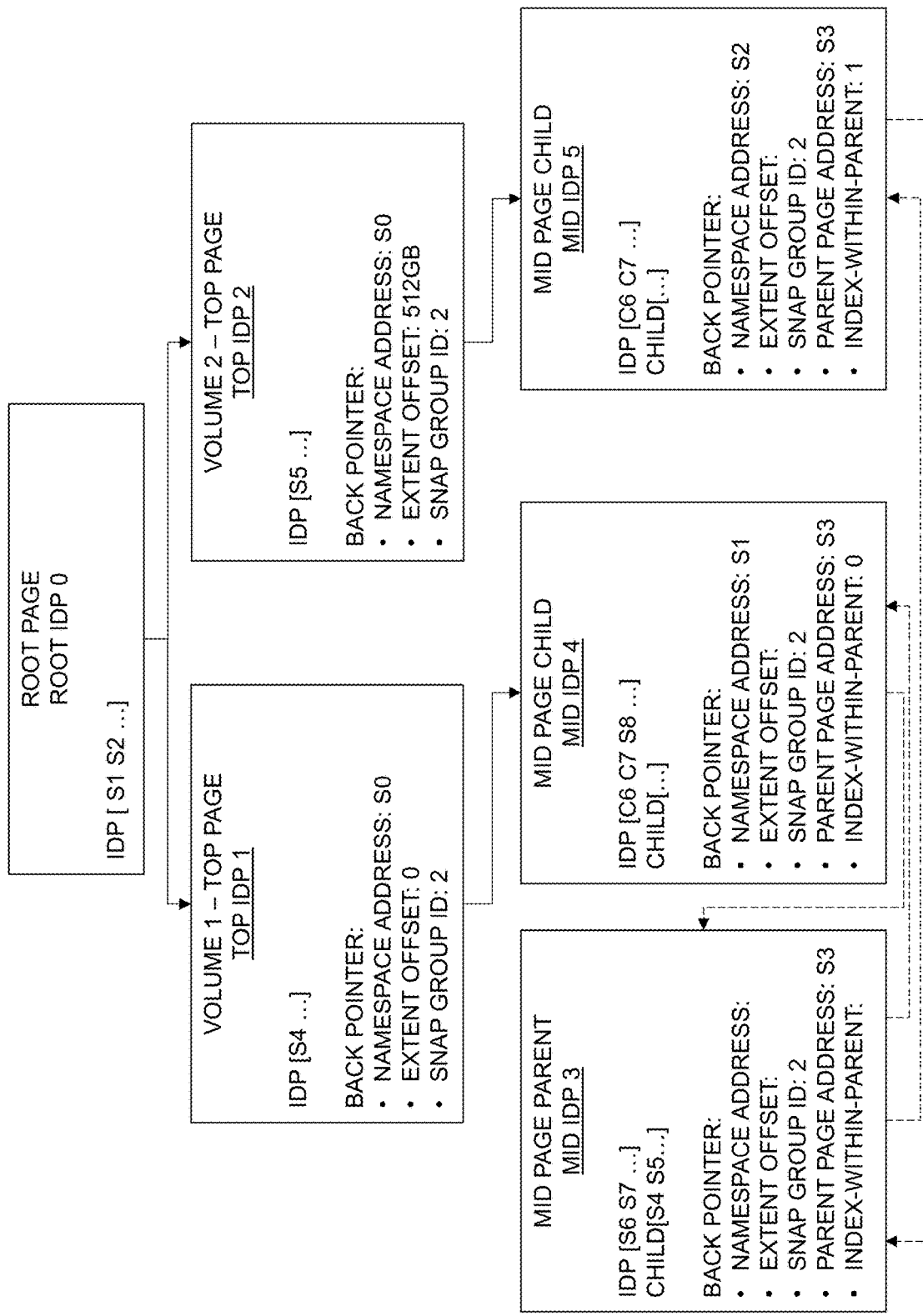
FIG. 8 shows a portion of the tree structure of FIGS. 4A and 4B in an illustrative embodiment.

With reference to FIG. 8, an example portion of the B-tree structure comprising a root IDP page 0, top IDP pages 1 and 2, and mid IDP pages 3, 4 and 5 is illustrated. As can be seen in FIG. 8, a root IDP page 0 comprises an array of IDP pointers, S1 S2, . . . , which point to corresponding top pages, e.g., top IDP pages 1 and 2. As an example, each IDP pointer S1 and S2 may comprise a namespace address at which the corresponding top IDP page 1 and 2 is located.

Top IDP page 1 comprises an array of IDP pointers, S4 . . . , which point to corresponding mid IDP pages, e.g., mid IDP page 4. Top IDP page 2 comprises an array of IDP pointers, S5 . . . , which point to corresponding mid IDP pages, e.g., mid IDP page 5. As an example, each IDP pointer S4 and S5 may comprise a namespace address at which the corresponding mid IDP page 4 and 5 is located.

Mid IDP page 3 comprises an array of IDP pointers, S6 S7 . . . , which point to corresponding leaf IDP pages, e.g., leaf IDP pages 6 and 7 (not shown).

Mid IDP page 4, which is a child of mid IDP page 3 that has been modified since being generated as part of a snapshot of mid IDP page 3, comprises an array of IDP pointers, C6 C7 S8 . . . , which point to corresponding leaf IDP pages, e.g., leaf IDP pages 6, 7 and 8 (not shown). It is important to note that IDP pointers C6 and C7 are copies of the IDP pointers S6 and S7 of mid IDP page 3 while IDP pointer S8 is a source IDP pointer that is not found in mid IDP page 3.

Mid IDP page 5, which is a child of mid IDP page 3 that has not been modified since being generated as part of a snapshot of mid IDP page 3, comprises an array of IDP pointers, C6 C7 . . . , which point to corresponding leaf IDP pages, e.g., leaf IDP pages 6 and 7 (not shown). Since mid IDP page 5 has not been modified, no source IDP pointers are present.

Each of the top IDP pages 403, mid IDP pages 405 and leaf IDP pages 407 also comprise a back pointer. The back pointer comprises information or metadata about relationships between associated IDP pages in the B-tree structure. For example, back pointer found in top IDP page 1 may comprise a namespace address S0 corresponding to root IDP page 0. For example, the namespace address S0 found in top IDP page 1 comprises the namespace address where the root IDP page 0 is located in the logical address space and may be utilized by mapper module 315 to identify the root IDP 0 based on the top IDP page 1. The other IDP pages comprise similar namespace addresses that identify a vertical relationship with an IDP page at a higher IDP page level. The back pointers also comprise an extent offset and a snap group identifier similar to that described above for FIG. 7.

In illustrative embodiments, the back pointer may also comprise additional information about a parent-child relationship between IDP pages of the same IDP page level. For example, as shown in FIG. 8, the back pointer of mid IDP page 4 comprises additional information including a parent page address, e.g., S3, and an index-within-parent, e.g., 0. The parent page address allows the mapper module 315 to traverse the B-tree structure horizontally from a child to a parent to validate the relationship. For example, mid IDP page 4 is a child of mid IDP page 3. Mid IDP page 4 comprises a parent page address, S3, which is a pointer to mid IDP page 3, e.g., the namespace address at which the mid IDP page 3 is located.

The index-within-parent comprises an indication of which index into a child array of an IDP page a pointer to a child resides. For example, mid IDP page 3 comprises a child array, S4 S5 . . . , which comprises a pointer to mid IDP page 4 at index 0 and a pointer to mid IDP page 5 at index 1. The child array allows the mapper module 315 to traverse the B-tree horizontally from parent to child while the index-within-parent allows the mapper module 315 to verify and validate the parent-child relationship. For example, if the IDP pointer at a particular index does not match the child IDP page which has the index-within-parent for that index, the mapper module 315 may determine that there has been a corruption in the parent-child relationship. While described and illustrated with reference to mid IDP pages, the parent page address, index-within-parent and child arrays may be included in any other level of IDP pages including, for example, top IDP pages, leaf IDP pages, or in some cases even root IDP pages. In illustrative embodiments, the child array may comprise 40 direct entries or any other number of direct entries each of which may store a pointer to a corresponding child page. In some embodiments, when all of the direct entries are full, the pointers of the child array may be converted into indirect pointers that each may point to an indirect array of pointers, if such an array is allocated. In some embodiments, for example, each array of indirect pointers may comprise up to 512 entries or any other number of entries and may be pointed to by one of the direct entries of the child array. In some embodiments, the arrays of indirect entries may be allocated on an as-needed basis where, for example, new arrays of indirect entries may be allocated only when the existing arrays of indirect entries are full.

As part of the file system check process, mapper module 315 browses the connected logical space of the block tree structure from the root pages 601 down to the top pages 603, mid pages 605 and leaf pages 607. At each level of the block tree structure, logical pages within the same snapshot group or clones are connected with horizontal parent-child relationships. When the mapper module 315 visits a parent page as part of the file system check process, the mapper module 315 utilizes the information in the child array to visit the corresponding child pages. In addition, mapper module 315, when visiting the corresponding child pages, expects that the parent page address and index-within-parent for those child pages correspond to the parent page and the index in the parent page's child array for that child page.

In some cases, however, corruption in the parent page address or index-within-parent of the child page may result in the child page not pointing back to the parent page. In other cases, when the mapper module 315 visits the child page and follows the parent page address and index-within parent to the corresponding parent page, the parent page may have corruption in the child array which results in a pointer to the child page not being present at the specified index.

In some embodiments, when the mapper module 315 utilizes an entry in the child array of the parent to visit a child page and the corresponding parent page address or index-within-parent does not match the parent page or the entry, the mapper module 315 may set a corresponding entry in a parent summary data structure 900 (FIG. 9) to indicate that the return link from the child page to the parent page is broken. In some embodiments, the mapper module 315 may also or alternatively set a corresponding entry in a child summary data structure 1000 (FIG. 10), which is utilized by the mapper module to enable faster searching for broken links from the parent page side during the reconstruction of the linkage as will be described in more detail below. In this case, the parent page has a link to the child page, but the child page does not have a return link to the parent page.

Figure 9:
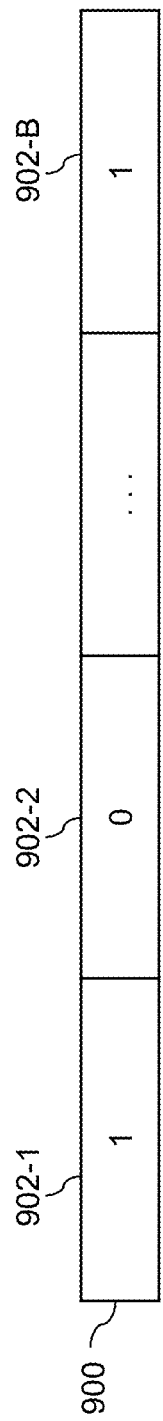
FIG. 9 shows an example parent summary data structure in an illustrative embodiment.

With reference to FIG. 9, the parent summary data structure 900 is generated during the file system check process by the mapper module 315, and comprises a plurality of entries 902-1, 902-2 . . . 902-B. In some embodiments, the parent summary data structure 900 comprises a bitmap and each entry 902 comprise a corresponding bit of the bitmap. Each entry 902 corresponds to one of the pages of the block tree structure. For example, as the mapper module 315 walks through the pages of the block tree structure and visits the parent and child pages based on their parent-child linkages, the parent summary data structure 900 is generated where, for example, each entry 902 in the parent summary data structure 900 corresponds to one of the pages of the block tree structure, e.g., root pages 401, top pages 403, mid pages 405, leaf pages 407, etc. In some embodiments, the entries 902 of the parent summary data structure 900 may correspond to the top pages 403, mid pages 405 and leaf pages 407 but not the root pages 401 since the root pages 401 are not configured with parent-child relationships in those embodiments.

In some embodiments, when the mapper module 315 utilizes the parent page address and index-within-parent in the child page to visit the parent page and the corresponding entry in the child array of the parent page does not point to the child page, the mapper module 315 may set a corresponding entry in the child summary data structure 1000 (FIG. 10) to indicate that the return link from the parent page to the child page is broken. In this case, the child page has a link to the parent page, but the parent page does not have a return link to the parent page.

Figure 10:
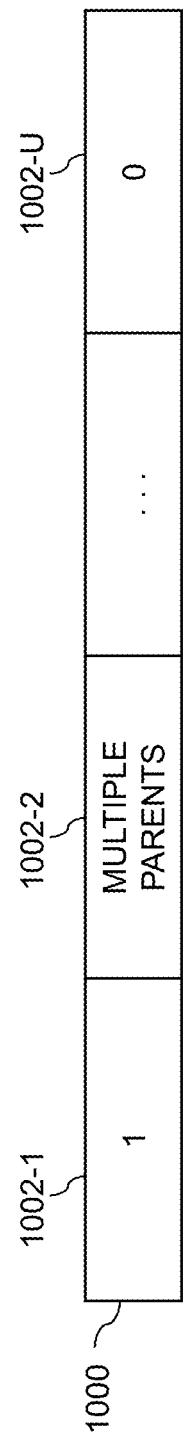
FIG. 10 shows an example child summary data structure in an illustrative embodiment.

With reference to FIG. 10, the child summary data structure 1000 is generated during the file system check process in a similar manner to the parent summary data structure 900, for example, by the mapper module 315. Child summary data structure 1000 comprises a plurality of entries 1002-1, 1002-2 . . . 1002-U. In some embodiments, the child summary data structure 1000 comprises a bitmap and each entry 1002 comprise a corresponding bit of the bitmap. Each entry 1002 may correspond to one of the pages of the block tree structure and may comprise an indication that a linkage between the child page and the parent page is broken. For example, as the mapper module 315 walks through the top pages 403, mid pages 405 and leaf pages 407, the child summary data structure 1000 is generated where each entry 1002 in the child summary data structure 1000 corresponds to one of the top pages 403, mid pages 405, leaf pages 407, etc. In some embodiments, as will be described in more detail below, a given entry 1002 of the child summary data structure 1000 may also be configured to contain an indication that more than one parent page has a pointer to that child page, for example, as shown by entry 1002-2.

In some cases, while traversing the block tree structure as part of the file system check process, mapper module 315 may determine that a particular page, e.g., a top page 603, mid page 605, or leaf page 607 is pointed to by multiple parent pages. In such a case, mapper module 315 may also set an entry 1002 corresponding to the child page in the child summary data structure 1000 to indicate that there are multiple parent pages pointing to this child page. In such embodiments, the entries 1002 of the child summary data structure 1000 may be a data structure other than a bitmap where, for example, each entry 1002 may be configured to store multiple values depending on the needs of the mapper module 315. For example, a particular entry 1002 may be configured to store an indication that the return link from a parent page to the child page is broken, an indication that multiple parent pages point to the child page, an indication that the return link from the child page to a parent page is broken, or any other information.

Once the parent summary data structure 900 and child summary data structure 1000 have been populated by the mapper module 315 as part of the file system check process, reconstruction of the broken linkages between the parent and child pages may be performed.

Figure 11:
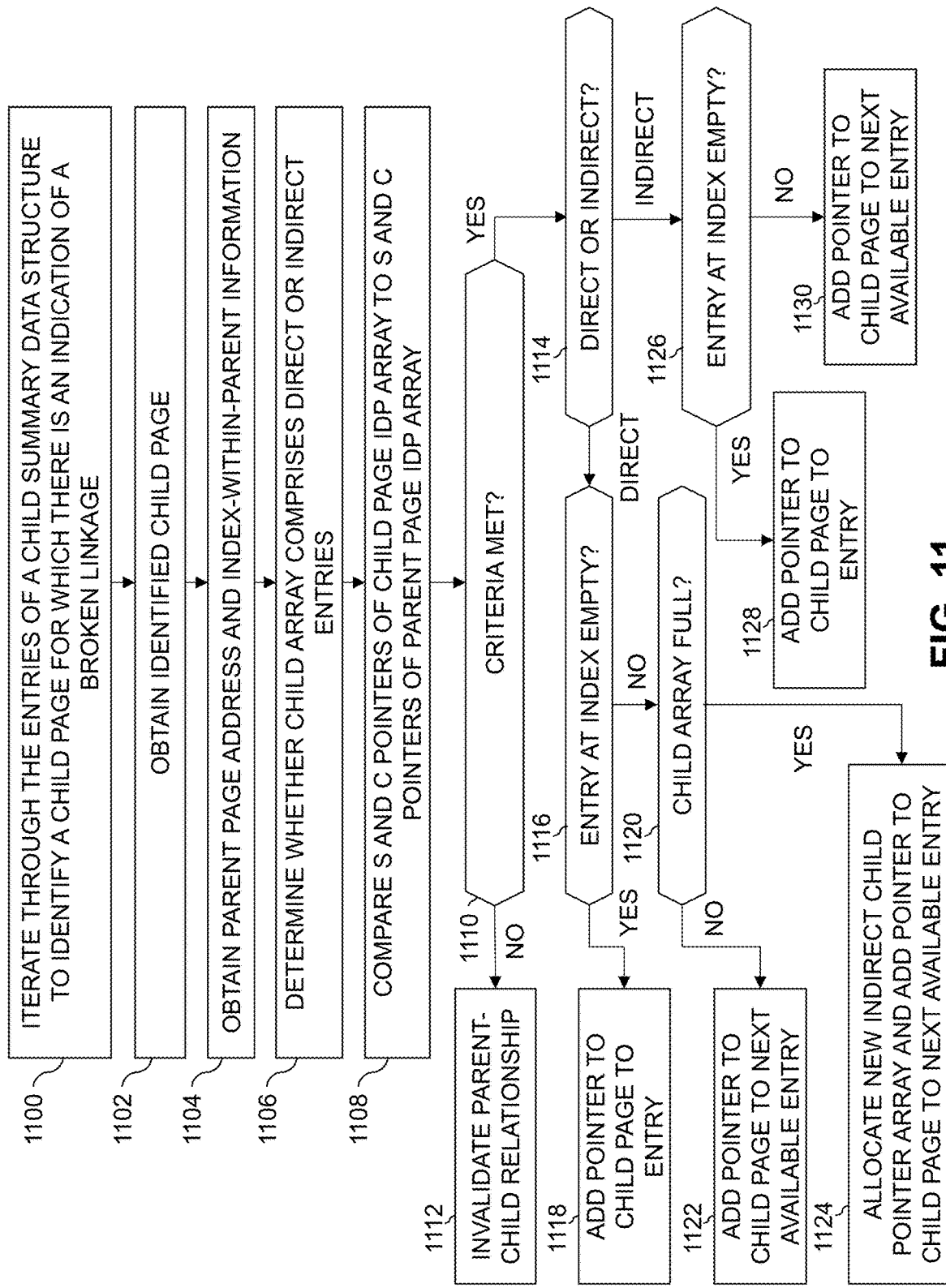
FIG. 11 is a flow diagram of an exemplary process for reconstructing links between logical pages in an illustrative embodiment.

An exemplary process for reconstructing links between logical pages in a case where a child page comprises a link to the parent page but the parent page does not comprise a link to the child page will now be described in more detail with reference to the flow diagram of FIG. 11. It is to be understood that this particular process is only an example, and that additional or alternative processes for reconstructing links between logical pages may be used in other embodiments.

In this embodiment, the process includes steps 1100 through 1130. These steps are assumed to be performed by the mapper module 315.

At step 1100, mapper module 315 iterates through the entries 1002 of the child summary data structure 1000 to identify a child page for which a corresponding entry 1002 comprises an indication of a broken return linkage from the parent page.

At step 1102, mapper module 315 obtains the child page corresponding to the entry.

At step 1104, mapper module 315 obtains the parent page address and index-within-parent information from the child page. The mapper module 315 may also determine whether or not the index-within-parent information is within known boundaries. For example, the index-within-parent information may comprise a limited set of values based on the available number of entries in the child array, whether direct or indirect. If the index-within-parent comprises a value other than a value that may be used to index into the child array of a parent, the value may be set to an unknown value.

At step 1106, mapper module 315 determines whether the child array comprises direct entries or indirect entries. This allows the mapper module 315 to determine the correct entry that corresponds to the child page.

At step 1108, mapper module 315 compares the source and copy pointers found in the IDP array of the child page to the source and copy pointers found in the IDP array of the parent page. In some embodiments, for example, a set of rules or criteria may be utilized for the comparison to determine whether or not the child page is part of a parent-child relationship with the parent page.

For example, mapper module 315 may determine whether or not each copy (C) pointer in the child page IDP array has a corresponding source (S) or C pointer with the same block address which identifies a page on the next level down (e.g., for a parent-child relationship between top pages 603, a C pointer in the child IDP array of the child top page 603 that points to a particular mid page 605 should have a corresponding S or C pointer in the corresponding parent top page 603 that also points to the particular mid page 605). If all C pointers in the child page do not have corresponding C or S pointers in the parent page, the link from the child page is removed as described below.

Mapper module 315 may also determine whether or not each S pointer in the child page has a corresponding S or C pointer in the parent page that comprises either a predefined pattern, e.g., all zeros, all ones or any other pattern, or that points to a different block address than the S pointer of the child page. For example, since an S pointer in the child page points to original data for that child page, e.g., due to changes after a snapshot was made, and not copied data from the snapshot, there should not be any corresponding pointer to the same data in the parent page. If there is a corresponding pointer, the link from the child page is removed as described below.

Mapper module 315 may also determine whether or not the C or S pointers of the child page have a zero entry, e.g., an invalid block address, an uncorrectable (U) value or a particular pattern (if a leaf). If such an entry exists for any of the C or S pointers, the link from the child page is removed as described below.

Mapper module 315 may also determine whether or not the child page has at least one C pointer with a corresponding S pointer in the parent page and no bad S pointers that conflict with the pointers of the parent page. If either of these criteria is not met, the link from the child page is removed as described below.

At step 1110, mapper module 315 determines whether or not all of the above criteria has been met. If any of the above criteria is not met, mapper module 315 invalidates the parent-child relationship at step 1112. For example, mapper module 315 removes the link to the parent page by setting the parent page address to the address of the child page itself. For example, mapper module 315 makes the child page an IDP with no parent page, e.g., a standalone page. After making the child page a standalone page, mapper module 315 updates the entry 1002 corresponding to the child page in the child summary data structure 1000 to indicate that the child page requires alternative processing.

If mapper module 315 determines that all of the above criteria is met, mapper module 315 proceeds to step 1114.

At step 1114, mapper module 315 determines whether or not the parent page's child array comprises direct entries with an entry having a pointer to the child page at the specific index-within-parent or indirect entries where each entry of the child array points to an indirect array of pointers one of which points to the child page.

If the parent page's child-array comprises direct entries, mapper module determines whether or not the entry at the index-within-parent is empty at step 1116. If the entry is empty, mapper module 315 inserts the pointer to the child page in the empty entry at the index-within-parent at step 1118. Mapper module 315 may also increase a child counter of the parent page which reflects how many child pages the parent page points to.

Referring back to step 1116, if entry at the index-within-parent is not empty, mapper module 315 determines whether or not the child array is full at step 1120. If the child array is not full, mapper module 315 adds the pointer to the child page at the next available empty entry in the parent page's child array at step 1122, increases the child counter of the parent page and changes the index-within-parent of the child page to the entry at which the pointer to the child page was added.

If parent page's child array is full at step 1120, mapper module 315 allocates a new indirect child pointer array, relocates all of the entries in the parent page's child array to the new indirect child pointer array, adds the pointer to the child page to an empty entry of the new indirect child pointer array and adds a pointer to the new indirect child pointer array to an entry of the parent page's child array, increases the child counter of the parent page and changes the index-within-parent of the child page to the entry at which the pointer to the child page was added at step 1124.

Referring back to step 1114, if the parent page's child array comprises indirect pointers, e.g., the index-within-parent points to an indirect child pointer array, mapper module 315 determines whether or not the entry in the indirect child pointer array corresponding to the index-within-parent is empty at step 1126. If the entry is empty, mapper module 315 inserts the pointer to the child page at the entry, updates the index-within-parent of the child page, updates a child counter for the indirect child pointer array and updates a child counter for the parent page child array at step 1128. If the entry was not empty, mapper module 315 inserts the pointer to the child page at the next available entry in the indirect child pointer array, updates the index-within-parent of the child page, updates a child counter for the indirect child pointer array and updates a child counter for the parent page child array at step 1130.

If the desired indirect child pointer array does not have any empty entries, the mapper module 315 check any other indirect child pointer arrays of the parent page child array for any empty entries. If such an entry is available, the mapper module 315 adds the pointer to the child page to that empty entry, updates the index-within-parent of the child page, updates a child counter for the indirect child pointer array and updates a child counter for the parent page child array in a similar manner to that described above.

If there are no empty slots in any of the allocated indirect child pointer arrays of the parent page child array, the mapper module 315 allocates a new indirect child pointer array and adds the pointer to the child page in a similar manner to that described above for step 1124.

Figure 12:
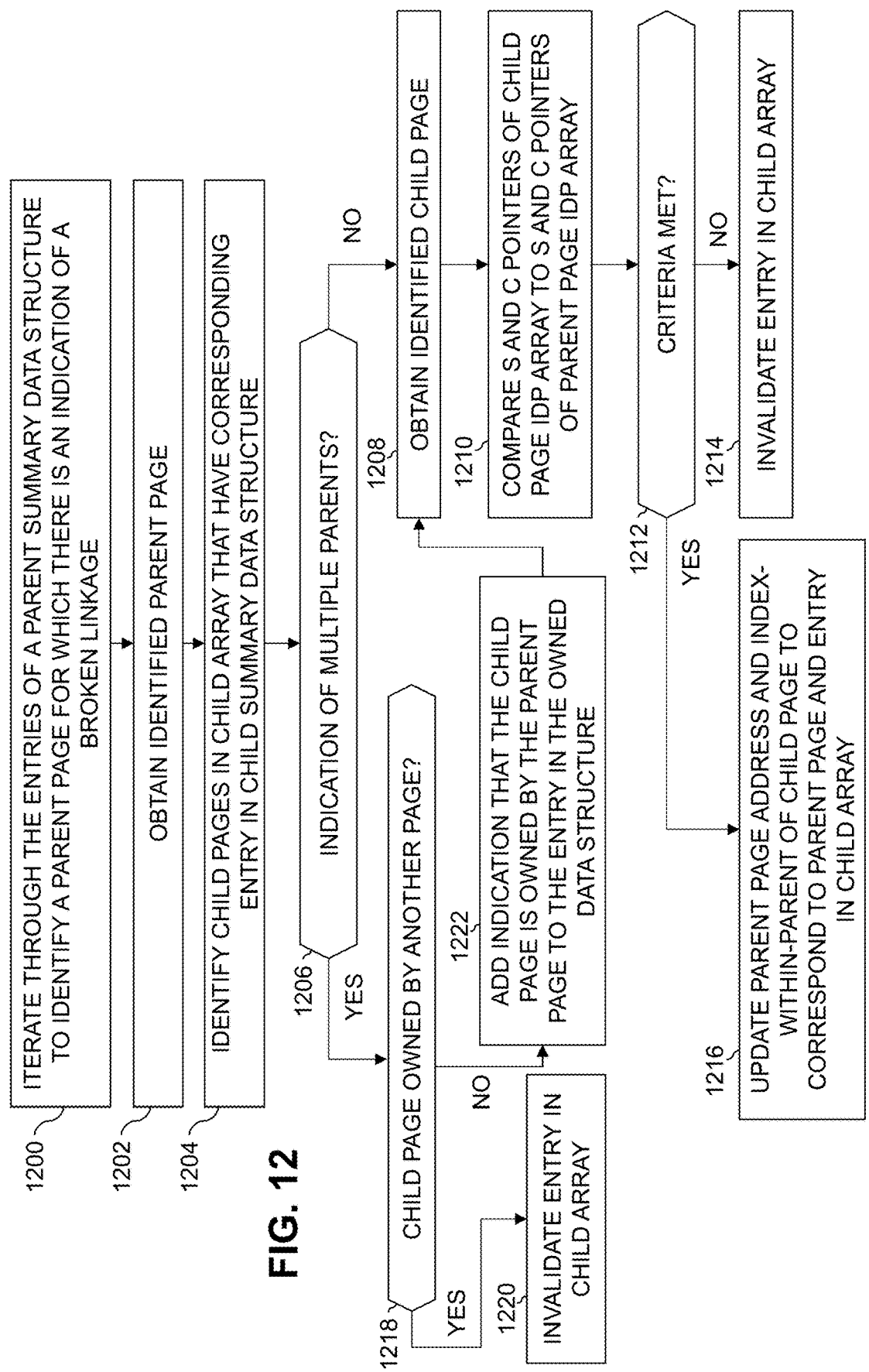
FIG. 12 is a flow diagram of another exemplary process for reconstructing links between logical pages in an illustrative embodiment.

An exemplary process for reconstructing links between logical pages in a case where a parent page comprises a link to the child page but the child page does not comprise a link to the parent page, e.g., parent address page and index-within-parent that correspond to the parent page, will now be described in more detail with reference to the flow diagram of FIG. 12. It is to be understood that this particular process is only an example, and that additional or alternative processes for reconstructing links between logical pages may be used in other embodiments.

In this embodiment, the process includes steps 1200 through 1222. These steps are assumed to be performed by the mapper module 315.

At step 1200, mapper module 315 iterates through the entries 902 of the parent summary data structure 900 to identify a parent page for which a corresponding entry 902 comprises an indication of a broken return linkage from a corresponding child page.

At step 1202, mapper module 315 obtains the parent page corresponding to the entry.

At step 1204, mapper module 315 identifies which child pages have both a corresponding entry in the child array of the parent page, whether direct or indirect, and a corresponding entry 1002 in the child summary data structure 1000 that comprises an indication of a broken linkage with a parent page.

At step 1206, mapper module 315 may also determine whether or not the entries 1002 comprise an indication that a child page has multiple corresponding parent pages. If an entry 1002 does not comprise an indication of multiple corresponding parent pages, the process proceeds to step 1208.

At step 1208, mapper module 315 obtains each identified child page.

At step 1210, mapper module 315 compares the source and copy pointers found in the IDP array of each identified child page to the source and copy pointers found in the IDP array of the parent page, for example, according to the criteria described above in step 1108, and determines whether or not the comparison criteria has been met at step 1212.

At step 1214, responsive to the comparison criteria not being met, e.g., the pointers of the parent page and child page do not match according to the criteria described above in step 1108, mapper module 315 invalidates the corresponding entry in the child array and the child counter for the parent page is decreased. In the case where the corresponding entry was stored in an indirect child pointer array, the child counter for the indirect child pointer array is also decreased.

At step 1216, responsive to the comparison criteria being met between the parent page and a given child page, e.g., all copy pointers of the given child page have corresponding source or copy pointers in the parent page, no source pointers of the given child page have corresponding source or copy pointers in the parent page, etc., as described above, mapper module 315 updates the given child page's parent page address and index-within-parent to correspond to the parent page and the entry in the child array of the parent page that comprises the pointer to the given child page, respectively.

Referring back to step 1206, in some cases, multiple parent pages may comprise an entry in their child array for the same child page which may indicate that one or both of the parent pages have been corrupted, for example, as seen in entry 1002-2. In such a case, mapper module 315 may mark the entry 1002 corresponding to the child page in the child summary data structure 1000 with an indication that the child page has multiple corresponding parent pages during the browsing of the block tree structure as part of the file system check process. For example, if mapper module 315 determines that the entries 1002 comprise an indication that a child page has multiple corresponding parent pages at step 1206, the process proceeds to step 1218.

Figure 13:
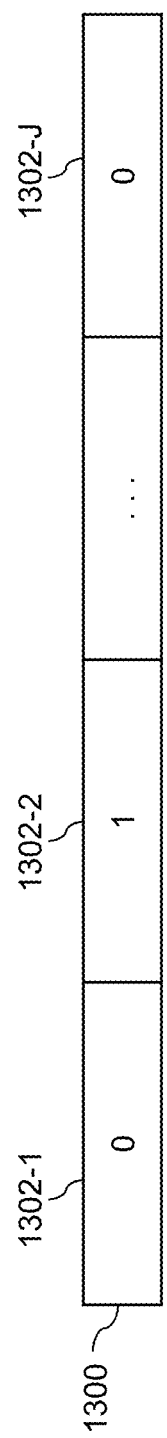
FIG. 13 shows an example owned data structure in an illustrative embodiment.

At step 1218 mapper module 315 determines whether or not an entry 1302 in an owned data structure 1300, e.g., as shown in FIG. 13, that corresponds to the child page comprises an indication that the child page is owned by another parent page. For example, the owned data structure 1300 may comprise entries 1302-1, 1302-2 . . . 1302-J. In some embodiments, the owned data structure 1300 may comprise a bitmap where each entry comprises a bit of the bitmap. If the entry 1302 comprises the indication that the child page is owned by another parent page, the corresponding entry in the child array of the parent page that is currently being visited by the mapper module 315 is invalidated and the child counter of the parent page is decreased at step 1220. No further processing is then performed for that child page. If the entry 1302 does not comprise the indication that the child page is owned by another parent page, e.g., the child page has not yet been claimed, the indication that the child page is owned by a parent page is added to the entry 1302 of the owned data structure 1300 at step 1222 and the process proceeds as normal to step 1208.

This process for handling a child page that has multiple potential parent pages ensures that only one parent page will claim ownership of that child page, e.g., the first parent page to be processed. Any subsequent parent page to be processed which comprises a pointer to that child page will invalidate the pointer due to the presence of an entry comprising the indication in the owned data structure 1300 that ownership of the child page has already been claimed.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for reconstructing links between logical pages will now be described in greater detail with reference to FIGS. 14 and 15. Although described in the context of system 100, these platforms may also be used to implement at least portions of other information processing systems in other embodiments.

Figure 14:
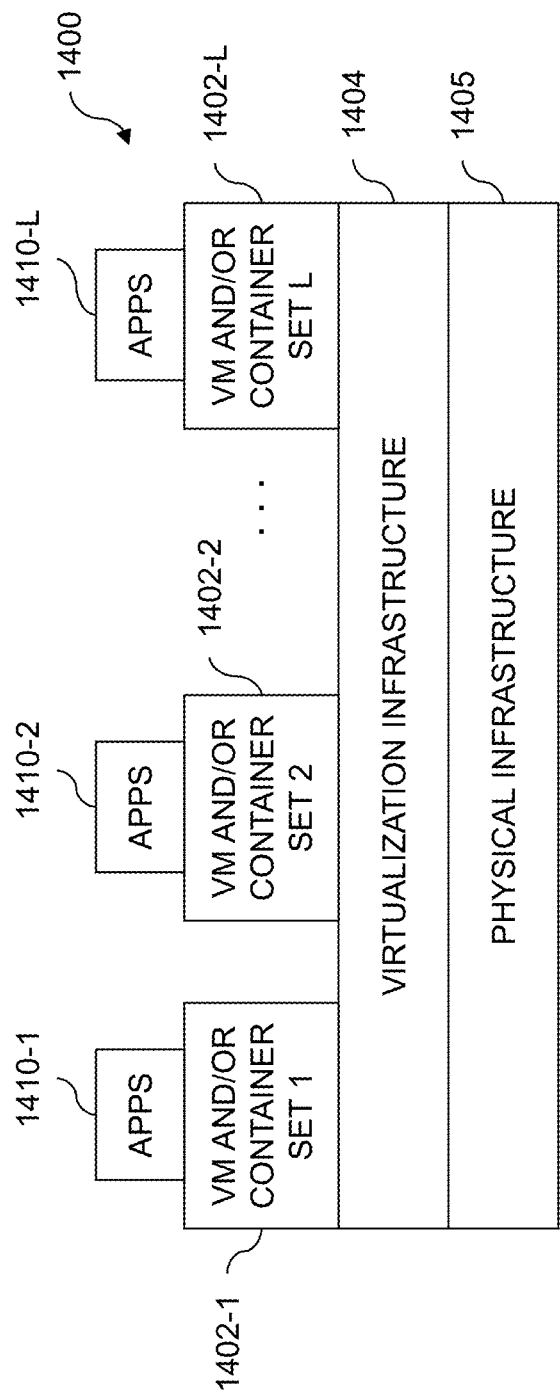
FIGS. 14 and 15 show examples of processing platforms that may be utilized to implement at least a portion of an information processing system in illustrative embodiments.
Figure 15:
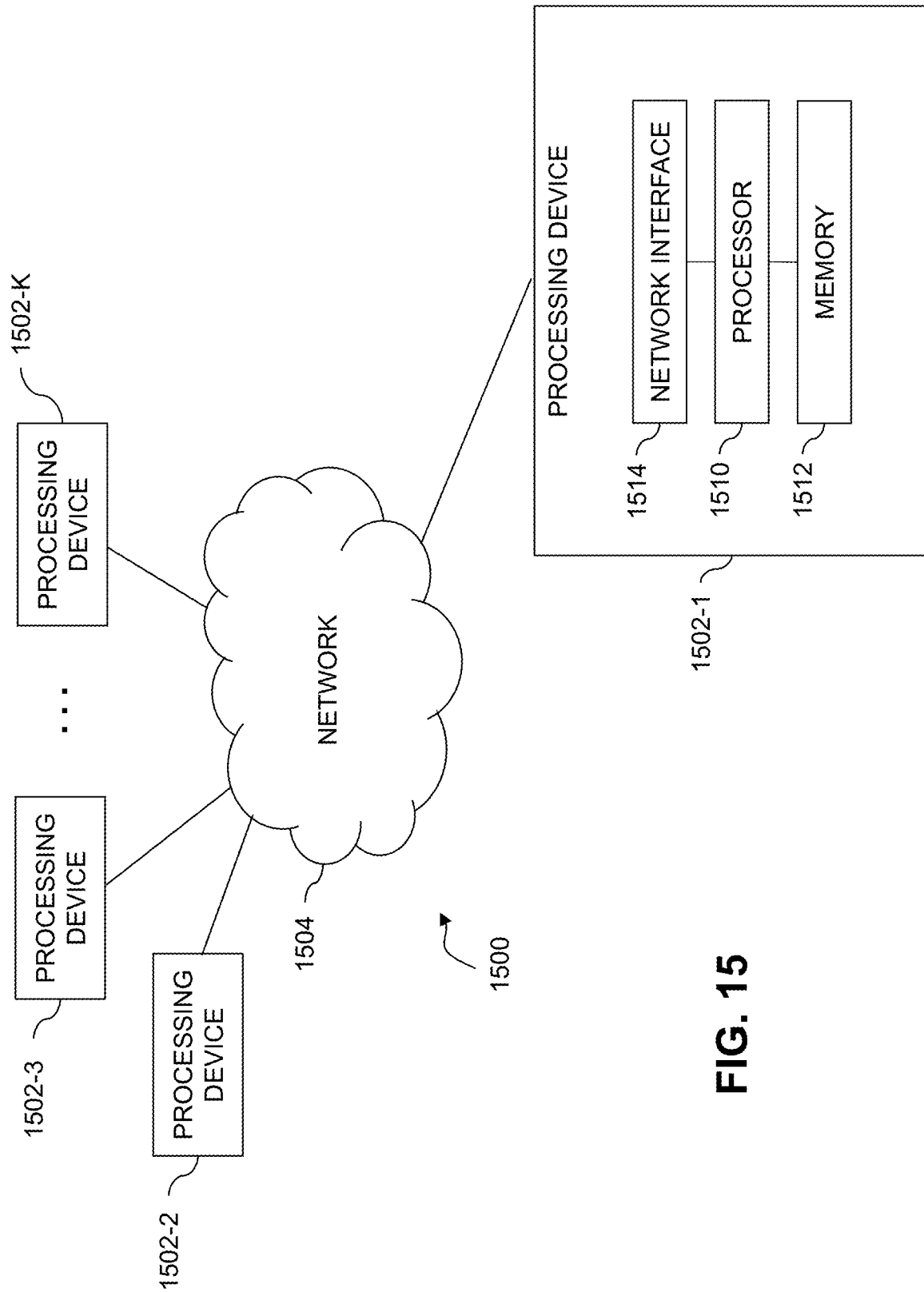

FIG. 14 shows an example processing platform comprising cloud infrastructure 1400. The cloud infrastructure 1400 comprises a combination of physical and virtual processing resources that may be utilized to implement at least a portion of the information processing system 100 in FIG. 1. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405 and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, . . . 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for reconstructing links between logical pages as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage devices, tree structures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising at least one processing device comprising a processor coupled to a memory, the at least one processing device being configured:
   to determine that an entry of a first data structure comprises an indication that a link between a first logical page of a plurality of logical pages of a logical address space and a second logical page of the plurality of logical pages is broken;
   to obtain the first logical page based at least in part on the determination that the entry of the first data structure comprises the indication;
   to obtain the second logical page based at least in part on the first logical page;
   to determine that a first address pointed to by a first pointer of the first logical page and a second address pointed to by a corresponding second pointer of the second logical page match;
   to determine that the first logical page corresponds to the second logical page based at least in part on the determination that the first address and the second address match; and
   to add an indication of a third address that corresponds to the first logical page to an entry associated with the second logical page based at least in part on the determination that the first logical page corresponds to the second logical page.

2. The apparatus of claim 1 wherein:
   the first logical page comprises an indication of a fourth address that corresponds to the second logical page and an index that indicates which entry associated with a second data structure of the second logical page corresponds to the first logical page;
   obtaining the second logical page based at least in part on the first logical page comprises obtaining the second logical page based at least in part on the indication of the fourth address that corresponds to the second logical page; and
   as part of adding the indication of the third address that corresponds to the first logical page to the entry associated with second logical page, the at least one processing device is further configured:
   to determine whether or not the entry associated with the second data structure that is indicated by the index is empty;
   responsive to a determination that the entry associated with the second data structure that is indicated by the index is empty, to add the indication of the third address to the entry; and
   responsive to a determination that the entry associated with the second data structure comprises an indication of an address corresponding to another logical page, to add the indication of the third address to another empty entry associated with the second data structure and to update the index of the first logical page to indicate the entry to which the indication of the third address was added.

3. The apparatus of claim 2 wherein:
the second data structure comprises a plurality of entries; and
as part of adding the indication of the third address to the another empty entry associated with the second data structure, the at least one processing device is further configured:
 to determine that the plurality of entries of the second data structure are full;
 to allocate a third data structure for storing indications of addresses associated with the second data structure;
 to copy the indications of addresses stored in the plurality of entries of the second data structure to corresponding entries in the third data structure;
 to add the indication of the third address to an empty entry of the third data structure; and
 to add an indication of the third data structure to an entry of the second data structure.

4. The apparatus of claim 1 wherein:
the at least one processing device organizes the logical address space as a tree structure comprising a plurality of logical page levels;
a first logical page level of the plurality of logical page levels comprises the first logical page and the second logical page;
a second logical page level of the plurality of logical page levels comprises a third logical page; and
determining that the first address and the second address match comprises determining that the first address and the second address are the same address and correspond to the third logical page.

5. The apparatus of claim 1 wherein the at least one processing device is further configured to perform a file system check process, the file system check process comprising:
 obtaining the first logical page;
 determining a parent-child relationship between the first logical page and the second logical page based at least in part on an indication in the first logical page of a fourth address that corresponds to the second logical page;
 obtaining the second logical page based at least in part on the indication in the first logical page of the fourth address that corresponds to the second logical page;
 determining that the second logical page does not comprise an indication of the third address that corresponds to the first logical page;
 generating the first data structure; and
 adding the indication that the link between the first logical page and the second logical page is broken to the entry of the first data structure based at least in part on the determination that the second logical page does not comprise the indication of the third address that corresponds to the first logical page, the entry of the first data structure corresponding to the first logical page.

6. The apparatus of claim 1 wherein the at least one processing device is further configured:
 to determine that a second entry of the first data structure comprises an indication that a link between a fourth logical page of a plurality of logical pages and a fifth logical page of the plurality of logical pages is broken;
 to obtain the fourth logical page based at least in part on the determination that the second entry of the first data structure comprises the indication, the fourth logical page comprising a plurality of pointers;
 to obtain the fifth logical page based at least in part on address information in the fourth logical page that points to the fifth logical page;
 to determine whether or not each pointer of the plurality of pointers of the fourth logical page that is a copy pointer has a corresponding source pointer or copy pointer in the fifth logical page; and
 responsive to at least one of the copy pointers of the fourth logical page not having a corresponding source or copy pointer in the fifth logical page, to set the address information in the fourth logical page to point to the fourth logical page.

7. The apparatus of claim 6 wherein the at least one processing device is further configured:
 to determine whether or not each pointer of the plurality of pointers of the fourth logical page that is a source pointer has a corresponding source pointer or copy pointer in the fifth logical page; and
 responsive to at least one of the source pointers of the fourth logical page having a corresponding source or copy pointer in the fifth logical page, to set the address information in the fourth logical page to point to the fourth logical page.

8. A method comprising:
 determining that an entry of a first data structure comprises an indication that a link between a first logical page of a plurality of logical pages of a logical address space and a second logical page of the plurality of logical pages is broken;
 obtaining the first logical page based at least in part on the determination that the entry of the first data structure comprises the indication;
 obtaining the second logical page based at least in part on the first logical page;
 determining that a first address pointed to by a first pointer of the first logical page and a second address pointed to by a corresponding second pointer of the second logical page match;
 determining that the first logical page corresponds to the second logical page based at least in part on the determination that the first address and the second address match; and
 adding an indication of a third address that corresponds to the first logical page to an entry associated with the second logical page based at least in part on the determination that the first logical page corresponds to the second logical page;
wherein the method is performed by at least one processing device comprising a processor coupled to a memory.

9. The method of claim 8 wherein:
the first logical page comprises an indication of a fourth address that corresponds to the second logical page and an index that indicates which entry associated with a second data structure of the second logical page corresponds to the first logical page;
obtaining the second logical page based at least in part on the first logical page comprises obtaining the second logical page based at least in part on the indication of the fourth address that corresponds to the second logical page; and
as part of adding the indication of the third address that corresponds to the first logical page to the entry associated with second logical page, the method further comprises:

determining whether or not the entry associated with the second data structure that is indicated by the index is empty;

responsive to a determination that the entry associated with the second data structure that is indicated by the index is empty, adding the indication of the third address to the entry; and responsive to a determination that the entry associated with the second data structure comprises an indication of an address corresponding to another logical page, adding the indication of the third address to another empty entry associated with the second data structure and to update the index of the first logical page to indicate the entry to which the indication of the third address was added.

10. The method of claim 9 wherein:

the second data structure comprises a plurality of entries; and as part of adding the indication of the third address to the another empty entry associated with the second data structure, the method further comprises:
determining that the plurality of entries of the second data structure are full;
allocating a third data structure for storing indications of addresses associated with the second data structure;
copying the indications of addresses stored in the plurality of entries of the second data structure to corresponding entries in the third data structure;
adding the indication of the third address to an empty entry of the third data structure; and
adding an indication of the third data structure to an entry of the second data structure.

11. The method of claim 8 wherein:

the logical address space is organized as a tree structure comprising a plurality of logical page levels;

a first logical page level of the plurality of logical page levels comprises the first logical page and the second logical page;

a second logical page level of the plurality of logical page levels comprises a third logical page; and determining that the first address and the second address match comprises determining that the first address and the second address are the same address and correspond to the third logical page.

12. The method of claim 8 wherein the method further comprises performing a file system check process, the file system check process comprising:

obtaining the first logical page;
determining a parent-child relationship between the first logical page and the second logical page based at least in part on an indication in the first logical page of a fourth address that corresponds to the second logical page;
obtaining the second logical page based at least in part on the indication in the first logical page of the fourth address that corresponds to the second logical page;
determining that the second logical page does not comprise an indication of the third address that corresponds to the first logical page;
generating the first data structure; and
adding the indication that the link between the first logical page and the second logical page is broken to the entry of the first data structure based at least in part on the determination that the second logical page does not comprise the indication of the third address that corresponds to the first logical page, the entry of the first data structure corresponding to the first logical page.

13. The method of claim 8 wherein the method further comprises:

determining that a second entry of the first data structure comprises an indication that a link between a fourth logical page of a plurality of logical pages and a fifth logical page of the plurality of logical pages is broken;
obtaining the fourth logical page based at least in part on the determination that the second entry of the first data structure comprises the indication, the fourth logical page comprising a plurality of pointers;
obtaining the fifth logical page based at least in part on address information in the fourth logical page that points to the fifth logical page;
determining whether or not each pointer of the plurality of pointers of the fourth logical page that is a copy pointer has a corresponding source pointer or copy pointer in the fifth logical page; and
responsive to at least one of the copy pointers of the fourth logical page not having a corresponding source or copy pointer in the fifth logical page, setting the address information in the fourth logical page to point to the fourth logical page.

14. The method of claim 13 wherein the method further comprises:

determining whether or not each pointer of the plurality of pointers of the fourth logical page that is a source pointer has a corresponding source pointer or copy pointer in the fifth logical page; and
responsive to at least one of the source pointers of the fourth logical page having a corresponding source or copy pointer in the fifth logical page, setting the address information in the fourth logical page to point to the fourth logical page.

15. An apparatus comprising at least one processing device comprising a processor coupled to a memory, the at least one processing device being configured:

to determine that an entry of a first data structure comprises an indication that a link between a first logical page of a plurality of logical pages of a logical address space and a second logical page of the plurality of logical pages is broken;
to obtain the first logical page based at least in part on the determination that the entry of the first data structure comprises the indication, the first logical page comprising a second data structure comprising a plurality of entries, a given entry of the plurality of entries corresponding to the second logical page;
to obtain the second logical page based at least in part on the given entry;
to determine whether or not a first address pointed to by a first pointer of the first logical page and a second address pointed to by a corresponding second pointer of the second logical page match; and
responsive to the first address and the second address matching, to set parent information in the second logical page to point to the first logical page.

16. The apparatus of claim 15 wherein setting parent information in the second logical page to point to the first logical page comprises setting a parent page address in the second logical page to point to the first logical page and setting an index-in-parent value in the second logical page to indicate an index of the given entry in the second data structure.

17. The apparatus of claim 15 wherein the at least one processing device is further configured, responsive to the first address not matching the second address, to set the given entry to invalid.

18. The apparatus of claim 15 wherein the at least one processing device is further configured:
- to determine that an entry that corresponds to the second logical page in a third data structure comprises an indication that multiple logical pages are linked to the second logical page;
- to determine whether or not an entry that corresponds to the second logical page in a fourth data structure comprises an indication that the second logical page is owned by another logical page; and
- responsive to determining that the second logical page is owned by another logical page, to set the given entry to invalid.

19. The apparatus of claim 18 wherein the at least one processing device is further configured, responsive to determining that the second logical page is not owned by another logical page, to set the entry that corresponds to the second logical page in the fourth data structure to indicate that the second logical page is owned by another logical page.

20. The apparatus of claim 15 wherein obtaining the second logical page based at least in part on the given entry comprises:
- determining that a third data structure comprises an indication that a link between the second logical page and the first logical page is broken; and
- obtaining the second logical page based at last in part on the determination that the third data structure comprises the indication that the link between the second logical page and the first logical page is broken.

* * * * *